United States Patent
Sella et al.

(10) Patent No.: US 11,205,796 B2
(45) Date of Patent: *Dec. 21, 2021

(54) ELECTROLYTE ADDITIVES IN LITHIUM-ION BATTERIES

(71) Applicant: StoreDot Ltd., Herzeliya (IL)

(72) Inventors: Eran Sella, Tel-Aviv (IL); Mor Shmuel Armon, Ramat-Gan (IL)

(73) Assignee: STOREDOT LTD., Herzeliya (IL)

( * ) Notice: Subject to any disclaimer, the term of this patent is extended or adjusted under 35 U.S.C. 154(b) by 157 days.

This patent is subject to a terminal disclaimer.

(21) Appl. No.: 16/291,031

(22) Filed: Mar. 4, 2019

(65) Prior Publication Data

US 2019/0198912 A1   Jun. 27, 2019

Related U.S. Application Data

(63) Continuation-in-part of application No. 16/243,190, filed on Jan. 9, 2019, which is a continuation-in-part (Continued)

(51) Int. Cl.
*H01M 10/052* (2010.01)
*H01M 10/0569* (2010.01)
(Continued)

(52) U.S. Cl.
CPC ......... *H01M 10/052* (2013.01); *H01M 4/131* (2013.01); *H01M 4/134* (2013.01);
(Continued)

(58) Field of Classification Search
None
See application file for complete search history.

(56) References Cited

U.S. PATENT DOCUMENTS

| | | | |
|---|---|---|---|
| 3,778,254 | A | 12/1973 | Cole et al. |
| 5,773,165 | A | 6/1998 | Sugeno |

(Continued)

FOREIGN PATENT DOCUMENTS

| | | |
|---|---|---|
| CA | 2161076 | 4/1996 |
| CA | 2258026 | 12/1997 |

(Continued)

OTHER PUBLICATIONS

U.S. Appl. No. 62/711,639, filed Jul. 30, 2018, Sella et al.

(Continued)

*Primary Examiner* — Daniel S Gatewood
(74) *Attorney, Agent, or Firm* — Reches Patent

(57) ABSTRACT

Lithium ion batteries and electrolytes therefor are provided, which include electrolyte additives having dithioester functional group(s) that stabilize the SEI (solid-electrolyte interface) at the surfaces of the anode material particles, and/or stabilize the CEI (cathode electrolyte interface) at the surfaces of the cathode material particles, and/or act as oxygen scavengers to prevent cell degradation. The electrolyte additives having dithioester functional group(s) may function as polymerization controlling and/or chain transfer agents that regulate the level of polymerization of other electrolyte components, such as VC (vinyl carbonate) and improve the formation and operation of the batteries. The lithium ion batteries may have metalloid-based anodes—including mostly Si, Ge and/or Sn as anode active material particles.

18 Claims, 2 Drawing Sheets

Related U.S. Application Data of application No. 15/844,689, filed on Dec. 18, 2017, now Pat. No. 10,199,677, application No. 16/291,031, which is a continuation-in-part of application No. 16/157,128, filed on Oct. 11, 2018, now Pat. No. 11,069,918, which is a continuation of application No. 15/844,689, filed on Dec. 18, 2017, now Pat. No. 10,199,677, which is a continuation-in-part of application No. 15/447,889, filed on Mar. 2, 2017, now Pat. No. 10,096,859, and a continuation-in-part of application No. 15/447,784, filed on Mar. 2, 2017.

(60) Provisional application No. 62/319,341, filed on Apr. 7, 2016, provisional application No. 62/337,416, filed on May 17, 2016, provisional application No. 62/371,874, filed on Aug. 8, 2016, provisional application No. 62/401,214, filed on Sep. 29, 2016, provisional application No. 62/401,635, filed on Sep. 29, 2016, provisional application No. 62/421,290, filed on Nov. 13, 2016, provisional application No. 62/426,625, filed on Nov. 28, 2016, provisional application No. 62/427,856, filed on Nov. 30, 2016, provisional application No. 62/435,783, filed on Dec. 18, 2016, provisional application No. 62/441,458, filed on Jan. 2, 2017, provisional application No. 62/482,450, filed on Apr. 6, 2017, provisional application No. 62/482,891, filed on Apr. 7, 2017, provisional application No. 62/550,711, filed on Aug. 28, 2017, provisional application No. 62/711,639, filed on Jul. 30, 2018, provisional application No. 62/804,778, filed on Feb. 13, 2019.

(51) Int. Cl.
*H01M 4/136* (2010.01)
*H01M 10/0525* (2010.01)
*H01M 10/42* (2006.01)
*H01M 4/134* (2010.01)
*H01M 4/131* (2010.01)
*H01M 10/0567* (2010.01)

(52) U.S. Cl.
CPC ....... *H01M 4/136* (2013.01); *H01M 10/0525* (2013.01); *H01M 10/0569* (2013.01); *H01M 10/4235* (2013.01); *H01M 10/0567* (2013.01); *H01M 2300/0051* (2013.01); *Y02T 10/70* (2013.01)

(56) References Cited

U.S. PATENT DOCUMENTS

| | | | |
|---|---|---|---|
| 6,051,340 | A | 4/2000 | Kawakami |
| 6,399,255 | B2 | 6/2002 | Herreyre |
| 6,492,061 | B1 | 12/2002 | Gauthier et al. |
| 6,541,156 | B1 | 4/2003 | Fuse et al. |
| 6,558,438 | B1 | 5/2003 | Satoh |
| 6,599,662 | B1 | 7/2003 | Chiang et al. |
| 7,192,673 | B1 | 3/2007 | Ikeda et al. |
| 7,656,120 | B2 | 2/2010 | Neu et al. |
| 7,906,238 | B2 | 3/2011 | Le |
| 7,956,576 | B2 | 6/2011 | Neu et al. |
| 8,021,791 | B1 | 9/2011 | Plichta et al. |
| 8,945,774 | B2 | 2/2015 | Coowar et al. |
| 8,951,673 | B2 | 2/2015 | Wessells et al. |
| 9,406,927 | B1 | 8/2016 | Burshtain et al. |
| 9,472,804 | B2 | 10/2016 | Burshtain et al. |
| 9,583,761 | B2 | 2/2017 | Burshtain et al. |
| 9,728,776 | B2 | 8/2017 | Burshtain et al. |
| 9,871,247 | B2 | 1/2018 | Burshtain et al. |
| 10,096,859 | B2 | 10/2018 | Burshtain et al. |
| 10,110,036 | B2 | 10/2018 | Aronov |
| 10,199,677 | B2 | 2/2019 | Drach et al. |
| 2001/0017531 | A1 | 8/2001 | Sakakibara et al. |
| 2002/0122980 | A1 | 9/2002 | Fleischer et al. |
| 2002/0146623 | A1 | 10/2002 | Suzuki et al. |
| 2003/0039889 | A1 | 2/2003 | Park et al. |
| 2004/0033360 | A1 | 2/2004 | Armand et al. |
| 2004/0219428 | A1 | 11/2004 | Nagayama |
| 2005/0019659 | A1 | 1/2005 | Shiozaki et al. |
| 2005/0093512 | A1 | 5/2005 | Mader et al. |
| 2007/0003837 | A1 | 1/2007 | Nishimura et al. |
| 2007/0281216 | A1 | 12/2007 | Petrat et al. |
| 2007/0284159 | A1 | 12/2007 | Takami et al. |
| 2008/0093143 | A1 | 4/2008 | Harrison |
| 2008/0248386 | A1 | 10/2008 | Obrovac et al. |
| 2009/0017386 | A1 | 1/2009 | Xu |
| 2009/0111020 | A1 | 4/2009 | Yamaguchi et al. |
| 2009/0179181 | A1 | 7/2009 | Zhang et al. |
| 2009/0317637 | A1 | 12/2009 | Luhrs et al. |
| 2010/0134065 | A1 | 6/2010 | Iida |
| 2010/0134305 | A1 | 6/2010 | Lu et al. |
| 2010/0159331 | A1 | 6/2010 | Lee et al. |
| 2010/0190059 | A1 | 7/2010 | Graetz et al. |
| 2011/0123870 | A1 | 5/2011 | Oh et al. |
| 2011/0257001 | A1 | 10/2011 | Negishi |
| 2011/0260689 | A1 | 10/2011 | Kano |
| 2012/0045696 | A1 | 2/2012 | Herle |
| 2012/0088155 | A1 | 4/2012 | Yushin et al. |
| 2012/0164531 | A1 | 6/2012 | Chen et al. |
| 2012/0219866 | A1 | 8/2012 | Onuki |
| 2013/0040226 | A1 | 2/2013 | Yamauchi et al. |
| 2013/0059174 | A1 | 3/2013 | Zhamu |
| 2013/0224594 | A1 | 8/2013 | Yushin et al. |
| 2013/0229153 | A1 | 9/2013 | Sarkar et al. |
| 2013/0260285 | A1 | 10/2013 | Yamauchi et al. |
| 2013/0266875 | A1 | 10/2013 | Matsumoto et al. |
| 2014/0004426 | A1 | 1/2014 | Kerlau et al. |
| 2014/0011081 | A1 | 1/2014 | Ahn |
| 2014/0113202 | A1 | 4/2014 | Sun et al. |
| 2014/0127588 | A1 | 5/2014 | Kato et al. |
| 2014/0295267 | A1 | 10/2014 | Wang |
| 2015/0017515 | A1 | 1/2015 | Jeon et al. |
| 2015/0046110 | A1 | 2/2015 | Joe et al. |
| 2015/0221977 | A1 | 8/2015 | Hallac et al. |
| 2015/0367747 | A1 | 12/2015 | Decker et al. |
| 2016/0036045 | A1 | 2/2016 | Burshtain et al. |
| 2016/0064773 | A1 | 3/2016 | Choi et al. |
| 2016/0093916 | A1* | 3/2016 | Moon ................. H01M 10/052 429/303 |
| 2016/0104882 | A1 | 4/2016 | Yushin et al. |
| 2016/0149220 | A1 | 5/2016 | Uhm et al. |
| 2016/0264124 | A1 | 9/2016 | Hotta |
| 2016/0372753 | A1 | 12/2016 | Fukasawa et al. |
| 2017/0012279 | A1 | 1/2017 | Burshtain et al. |
| 2017/0207451 | A1 | 7/2017 | Burshtain et al. |
| 2017/0288232 | A1 | 10/2017 | Herle |
| 2017/0288271 | A1 | 10/2017 | Le |
| 2017/0294643 | A1 | 10/2017 | Burshtain et al. |
| 2017/0294644 | A1 | 10/2017 | Burshtain et al. |
| 2017/0294648 | A1 | 10/2017 | Burshtain et al. |
| 2017/0294649 | A1 | 10/2017 | Burshtain et al. |
| 2017/0294680 | A1 | 10/2017 | Burshtain et al. |
| 2017/0294687 | A1 | 10/2017 | Burshtain et al. |
| 2017/0373513 | A1 | 12/2017 | Aronov et al. |
| 2018/0050602 | A1 | 2/2018 | Aronov |
| 2018/0212236 | A1 | 7/2018 | Jacob et al. |
| 2018/0212239 | A1 | 7/2018 | Jacob et al. |
| 2018/0212240 | A1 | 7/2018 | Jacob et al. |
| 2018/0212439 | A1 | 7/2018 | Aronov |
| 2018/0301757 | A1 | 10/2018 | Burshtain et al. |
| 2018/0315990 | A1 | 11/2018 | Paz et al. |
| 2019/0148774 | A1 | 5/2019 | Kuks et al. |
| 2019/0198912 | A1 | 6/2019 | Sella et al. |

FOREIGN PATENT DOCUMENTS

| | | |
|---|---|---|
| CN | 101734675 | 6/2010 |
| CN | 104577081 | 4/2015 |
| EP | 1999818 | 12/2008 |

(56) References Cited

FOREIGN PATENT DOCUMENTS

| | | |
|---|---|---|
| EP | 2889097 | 7/2015 |
| JP | 2002-056891 | 2/2002 |
| JP | 2006-216276 | 8/2006 |
| JP | 2007-323837 | 12/2007 |
| JP | 2008-053092 | 3/2008 |
| JP | 2012/131674 | 7/2012 |
| JP | 2012-131674 A | 7/2012 |
| JP | 2014-002834 | 1/2014 |
| KR | 2012-121265 | 10/2012 |
| KR | 2015-0015070 | 2/2015 |
| KR | 2015-0015070 A2 | 2/2015 |
| WO | WO 2013/040356 | 3/2013 |
| WO | WO 2014068036 | 5/2014 |
| WO | WO 2015/145521 | 10/2015 |
| WO | WO 2016/031082 | 3/2016 |
| WO | WO 2018/109774 | 6/2018 |

OTHER PUBLICATIONS

U.S. Appl. No. 62/804,778, filed Feb. 13, 2019, Sella et al.

L. Barner et al. Complex Molecular Architecture Polymers via RAFT, Australian Journal of Chemistry 2004, 57, 19-24.

Q. Michaudel et al., "Mechanistic Insight into the Photocontrolled Cationic Polymerization of Vinyl Ethers", Journal of the American Chemical Society 2017, 139, 15530-15538.

Y. Zhu, "Diethyl(thiophen-2-ylmethyl)phosphonate: a novel multifunctional electrolyte additive for high voltage batteries", Journal of Materials Chemistry A, 2018, 6, 10990-11004.

K. Ciosek Hogstrom et al., "The Influence of PMS-Additive on the Electrode/Electrolyte Interfaces in LiFePO4/Graphite Li-Ion Batteries", The Journal of Physical Chemistry, 2013, 117, 23476-23486.

J. Gardiner et al., "Dithiocarbamate RAFT agents with broad applicability—the 3,5-dimethyl-1H-pyrazole-1-carbodithioates", Polymer Chemistry 2016, 7, 481-492.

J. Pires et al., "Role of propane sultone as an additive to improve the performance of a lithium-rich cathode material at a high potential", RSC Advances 2015, 5, 42088-42094.

G. Zhu et al., "Dimethylacrylamide, a novel electrolyte additive, can improve the electrochemical performances of silicon anodes in lithium-ion batteries", RSC Advances 2019, 9, 435-443.

Changxi Li et al., " Radical-Induced Oxidation of RAFT Agents—A Kinetic Study", Journal of Polymer Science: Part A: Polymer Chemistry, 2010, 1351-1360.

Molga et al., "Navigating around Patented Routes by Preserving Specific Motifs along Computer-Planned Retrosynthetic Pathways", Chem 5, 1-14, Feb. 14, 2019.

U.S. Appl. No. 16/243,190, filed Jan. 9, 2019, Kuks et al.

Chaudhuri et al. "Core/shell nanoparticles: classes, properties, synthesis mechanisms, characterization, and applications" Chemical Reviews, vol. 112, No. 4, pp. 2373-2433, 2012.

Wu et al. "Hydrogen Storage in Pillared Li-Dispersed Boron Carbide Nanotubes", J. Phys. Chem. C, 2008, vol. 112, No. 22, pp. 8458-8463.

Secrist "Compound Formation in the Systems Lithium-Carbon and Lithium-Boron", Journal of the American Ceramic Society, Oct. 1967, vol. 50, No. 10, pp. 520-523.

Suzuki et al. "Silicon nitride thin film electrode for lithium-ion batteries", Journal of Power Sources, 2013, vol. 231, pp. 186-189.

Konno et al. "Application of Si—C—O glass-like compounds as negative electrode materials for lithium hybrid capacitors", Journal of Power Sources, 2009, vol. 191, No. 2, pp. 623-627.

Hu et al. "Silicon/graphene based nanocomposite anode: large-scale production and stable high capacity for lithium ion batteries", Journal of Materials Chemistry A, 2014, vol. 2, No. 24, pp. 9118-9125.

Cui et al. "Carbon-Silicon Core-Shell Nanowires as High Capacity Electrode for Lithium Ion Batteries", NANO Letters, May 8, 2009, vol. 9, No. 9, pp. 3370-3374.

Kennedy et al. "High-Performance Germanium Nanowire-Based Lithium-Ion Battery Anodes Extending over 1000 Cycles Through in Situ Formation of a Continuous Porous Network", Nano Letters, 2014, vol. 14, pp. 716-723.

Hwang et al. "Mesoporous Ge/GeO2/Carbon Lithium-Ion Battery Anodes with High Capacity and High Reversibility", ACS NANO, Apr. 13, 2015, vol. 9, No. 5, pp. 5299-5309.

Balomenos et al. "Exergy Analysis of Metal Oxide Carbothemic Reduction under Vacuum—Sustainability prospects", International Journal of Thermodynamics, Jun. 4, 2012, vol. 15, No. 3, pp. 141-148.

Barton et al. "The Reduction of Germanium Dioxide With Graphite At High Temperatures", Journal of the Less-Common Metals, 1970, vol. 22, pp. 11-17.

Nitta et al. "High-Capacity Anode Materials for Lithium-Ion Batteries: Choice of Elements and Structures for Active Particles", Particle Systems Characterization, 2014, vol. 31, pp. 317-336.

Chung et al. "Electronically conductive phospho-olivines as lithium storage electrodes", nature materials, Oct. 22, 2002, vol. 1, pp. 123-128.

Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.

Kyotani et al. "Remarkable performance improvement of inexpensive ball-milled Si nanoparticles by carbon-coating for Li-ion batteries", Journal of Power Sources, Jul. 1, 2016, vol. 319, pp. 99-103.

Son et al. "Silicon carbide-free graphene growth on silicon for lithium-ion battery with high volumetric energy density", Nature Communications, Jun. 25, 2015, vol. 6, No. 7393, pp. 1-8.

Tow et al. "A Study of Highly Oriented Pyrolytic Graphite as a Model for the Graphite Anode in Li-Ion Batteries", Journal of The Electrochemical Society, 1999, vol. 146, No. 3, pp. 824-832.

Qi et al. "Threefold Increase in the Young's Modulus of Graphite Negative Electrode during Lithium Intercalation", Journal of The Electrochemical Society, 2010, vol. 157, No. 5, pp. A558-A566.

Qi et al. "Lithium Concentration Dependent Elastic Properties of Battery Electrode Materials from First Principles Calculations", Journal of The Electrochemical Society, 2014, vol. 161, No. 11, pp. F3010-F3018.

Wen et al. "Thermodynamic and Mass Transport Properties of "LiAl"", Solid-State Science and Technology, Dec. 1979, vol. 126, No. 12, pp. 2258-2266.

Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.

Sun et al. "Silicon/Wolfram Carbide@ Graphene composite: enhancing conductivity and structure stability in amorphous-silicon for high lithium storage performance", Electrochimica Acta. Jun. 25, 2016, vol. 191, pp. 462-472.

Cho et al. "Zero-Strain Intercalation Cathode for Rechargeable Li-Ion Cell", Angewandte Chemie, 2001, vol. 40, No. 18, pp. 3367-3369.

Ngo et al. "Mass-scalable synthesis of 3D porous germanium-carbon composite particles as an ultra-high rate anode for lithium ion batteries ", Energy & Environmental Science, 2015, vol. 8, pp. 3577-3588.

Billaud et al. "Synthesis and electrical resistivity of lithium-pyrographite intercalation compounds (stages I, II and III)", Materials Research Bulletin, Jul. 1979, vol. 14, No. 7, pp. 857-864.

Guriparti et al. "Review on recent progress of nanostructured anode materials for Li-ion batteries", Journal of Power Sources, 2014, vol. 257, pp. 421-443.

Scott et al. "Ultrathin Coatings on Nano-LiCoO2 for Li-Ion Vehicular Applications", Nano Letters, 2011, vol. 11, pp. 414-418.

Chen et al. "Conductive Rigid Skeleton Supported Silicon as High-Performance Li-Ion Battery Anodes", NANO Letters, 2012, vol. 12, pp. 4124-4130.

Kim et al. "Electrochemical properties of carbon-coated Si/B composite anode for lithium ion batteries", Journal of Power Sources, 2009, vol. 189, pp. 108-113.

(56) References Cited

OTHER PUBLICATIONS

Wand et al. "Boron-doped carbon nanotube-supported Pt nanoparticles with improved CO tolerance for methanol electro-oxidation", Phys. Chem. Chem. Phys., 2012, vol. 14, pp. 13910-13913.
Wang et al. "The dimensionality of Sn anodes in Li-ion batteries", materialstoday, Dec. 2012, vol. 15, No. 12, pp. 544-552.
Bhandavat et al. "Improved Electrochemical Capacity of Precursor-Derived Si(B)CN-Carbon Nanotube Composite as Li-Ion Battery Anode", ACS Applied Materials & Interfaces, Oct. 2, 2012, vol. 4, pp. 5092-5097.
Bhandavat et al. "Synthesis, Characterization, and High Temperature Stability of Si(B) CN-Coated Carbon Nanotubes Using a Boron-Modified Poly(ureamethylvinyl)Silazane Chemistry", Journal of the American Ceramic Society, 2012, vol. 95, No. 5, pp. 1536-1543.
Nowotny et al. "Investigations in the three systems: Molybdenum-Silicon-boron, tungsten-Silicon-boron and in which System: VS12-TaSi2", MB. Chem., 1956, vol. 88, No. 2, pp. 179-182.
Kasavajjula et al. "Nano- and bulk-silicon-based insertion anodes for lithium-ion secondary cells", Journal of Power Sources, 2007, Vo. 163, pp. 1003-1039.
Yom et al. "Improved electrochemical behavior of Tungsten Coated Silicon Monoxide-Carbon composite anode in lithium ion battery",Abstract #1041, The Electrochemical Society 224th ECS Meeting, Oct. 27-Nov. 1, 2013.
Liu el al. "A pomegranate-inspired nanoscale design for large-volume-change lithium battery anodes", Nature Nanotechnology, Mar. 2014, vol. 9, pp. 187-192.
Tao et al. "Hollow core-shell structured Si/C nanocomposites as high-performance anode materials for lithium-ion batteries", Nanoscale, 2014, vol. 6, pp. 3138-3142.
Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
Byeon "Multifunctional metal-polymer nanoagglomerates from singlepass aerosol self-assembly", Scientific Reports, Aug. 10, 2016, pp. 1-8.
Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-7.
Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, p. 12366-12371.
Molino et al. "Hydrophobic conducting polymer films from post deposition thiol exposure", Synthetic Metals 162, 2012, pp. 1464-1470.
Jankovski et al. "New boron based salts for lithium-ion batteries using conjugated ligands", Physical Chemistry Chemical Physics, May 19, 2016, vol. 18, pp. 16274-16280.
Aurbach et al. "A short review of failure mechanisms of lithium metal and lithiated graphite anodes in liquid electrolyte solutions", Solid State Ionics, 2002, vol. 148, pp. 405-416.
He et al. "Effect of solid electrolyte interface (SEI) film on cyclic performance of Li4Ti5O12 anodes for Li ion batteries", Journal of Power Sources, 2013, vol. 239, pp. 269-276.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1.33Ti1.67O4 Spinel", Journal of The Electrochemical Society, 1999, vol. 146, No. 3, pp. 857-861.
Doughty et al. "A General Discussion of Li Ion Battery Safety", The Electrochemical Society Interface, 2012, pp. 37-44.
E. McRae and J.F. Mareche "Stage dependence of the electrical resistivity of graphite intercalation compounds" *Journal of Physics C: Solid State Physics*, vol. 18, No. 8, Apr. 5, 1983, pp. 1627-1640, Lab. de Chimie du Solide Miner., Nancy Univ., Vandoeuvre, France.
Takatoshi Kasukabe et al. "Beads-Milling of Waste Si Sawdust into High-Performance Nanoflakes for Lithium-Ion Batteries" *Sci Rep.* 2017; 7: 42734. Published online Feb. 20, 2017.
Yongxin An et al. "Effects of VC-LiBOB binary additives on SEI formation in ionic liquid-organic composite electrolyte" RSC Advances, 2012, 2, Accepted Feb. 21, 2012, pp. 4097-4102.
Aaron M. Chockla "Tin-Seeded Silicon Nanowires for High Capacity Li-Ion Batteries" Department of Chemical Engineering, Texas Materials Institute, Center for Nano- and Molecular Science and Technology,The University of Texas at Austin, Austin, Texas 78712-1062, United States, pp. 3738-3745, Published: Sep. 11, 2012.
Yong-Mao Lin et al. "High performance silicon nanoparticle anode in fluoroethylene carbonate-based electrolyte for Li-ion batteriesw" Chem. Commun., 2012, 48, Accepted May 28, 2012, pp. 7268-7270.
*Rosa Mariel Danoary Tsirinomeny* "Contribution to the Ultra-Fast Charging of Electric Vehicles: The Configurable Modular Multilevel Converter (CMMC)" Mots-clés de l'auteur: Ultra-fast; lithium-titanate; UFCEV; CMMC; Flex-EV. Mar. 4, 2016.
Xu et al. "Reversible Conversion of Conducting Polymer Films from Superhydrophobic to Superhydrophilic", Angewandte Chemie, 2005, vol. 44, pp. 6009-6012.
Aldrich (Sigma-Aldrich MSDS Lithium hexafluorophosphate {http://www.sigmaaldrich.com/MSDS/MSDS/DisplayMSDSPage.do?country=US&language=en&productNumber=450227&brand=ALDRICH} Printed Dec. 19, 2017).
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF} date Nov. 4, 2014).
M. Moreno et al. "Ionic Liquid Electrolytes for Safer Lithium Batteries" Journal of The Electrochemical Society, 164 (1) A6026-A6031 (2017), pp. 6026-6031.
Andrzej Lewandowski et al. "Ionic liquids as electrolytes for Li-ion batteries—An overview of electrochemical studies" Journal of Power Sources 194 (2009) pp. 601-609.
Marisa C. Buzzeo et al. "Non-Haloaluminate Room-Temperature Ionic Liquids in Electrochemistry—A Review" ChemPhysChem 2004, 5, pp. 1106-1120.
International Search Report and Written Opinion of PCT Application No. PCT/IL2017/050424, dated Jul. 13, 2017.
Office action of U.S. Appl. No. 15/414,655 dated Aug. 14, 2017.
Office action of U.S. Appl. No. 15/447,784 dated Jun. 22, 2017.
Office action of U.S. Appl. No. 15/447,889 dated Jul. 17, 2017.
Office action of U.S. Appl. No. 15/480,919 dated Jul. 5, 2017.
Office action of U.S. Appl. No. 15/414,655, dated May 9, 2017.
Office action of U.S. Appl. No. 15/287,292, dated Dec. 15, 2017.
Office action of U.S. Appl. No. 15/447,784, dated Dec. 28, 2017.
Office Action for U.S. Appl. No. 15/480,888, dated Oct. 1, 2018.
Office Action for U.S. Appl. No. 15/853,885, dated Feb. 23, 2018.
Office action of U.S. Appl. No. 15/480,888 dated Sep. 13, 2017.
Office action of U.S. Appl. No. 15/447,784 dated Oct. 19, 2017.
Office action of U.S. Appl. No. 15/582,066 dated Aug. 21, 2017.
Office Action for U.S. Appl. No. 15/783,586, dated Apr. 6, 2018.
European Search Report for Application No. EP17206661.5, dated Apr. 16, 2018.
Office Action for U.S. Appl. No. 15/447,889, dated May 24, 2018.
Office Action for U.S. Appl. No. 15/480,904, dated Oct. 29, 2018.
Office Action for U.S. Appl. No. 15/480,911, dated Nov. 8, 2018.

(56) References Cited

OTHER PUBLICATIONS

Office Action for U.S. Appl. No. 15/480,922, dated Nov. 8, 2018.
Office Action for U.S. Appl. No. 15/844,689, dated Jan. 31, 2018.
Office Action for U.S. Appl. No. 15/844,689, dated Apr. 16, 2018.
Office Action for U.S. Appl. No. 15/844,689, dated May 23, 2018.
Notice of Allowance for U.S. Appl. No. 15/844,689, dated Sep. 4, 2018.
Office Action for U.S. Appl. No. 16/254,644, dated Mar. 1, 2019.
Notice of Allowance for U.S. Appl. No. 16/258,728, dated Mar. 6, 2019.
Office Action for CN Application No. 2015800456854, dated Mar. 22, 2019.
Office Action for U.S. Appl. No. 16/268,527, dated Apr. 2, 2019.

* cited by examiner

_US 11,205,796 B2_

ELECTROLYTE ADDITIVES IN LITHIUM-ION BATTERIES

CROSS REFERENCE TO RELATED APPLICATIONS

This application is a continuation-in-part of U.S. patent application Ser. No. 16/243,190, filed on Jan. 9, 2019, which is a continuation-in-part of U.S. patent application Ser. No. 15/844,689, filed on Dec. 18, 2017; this application is also a continuation-in-part of U.S. patent application Ser. No. 16/157,128, filed on Oct. 11, 2018, which is a continuation of U.S. patent application Ser. No. 15/844,689, filed on Dec. 18, 2017; U.S. patent application Ser. No. 15/844,689 is a continuation-in-part of U.S. application Ser. No. 15/447,889, filed on Mar. 2, 2017, and a continuation-in-part of U.S. application Ser. No. 15/447,784, filed on Mar. 2, 2017, both claiming the benefit of U.S. Provisional Application Nos. 62/319,341, filed Apr. 7, 2016, 62/337,416, filed May 17, 2016, 62/371,874, filed Aug. 8, 2016, 62/401,214, filed Sep. 29, 2016, 62/401,635, filed Sep. 29, 2016, 62/421,290, filed Nov. 13, 2016, 62/426,625, filed Nov. 28, 2016, 62/427,856, filed Nov. 30, 2016, 62/435,783, filed Dec. 18, 2016 and 62/441,458, filed Jan. 2, 2017; U.S. application Ser. No. 15/844,689 further claims the benefit of U.S. Provisional Application No. 62/482,450, filed on Apr. 6, 2017, 62/482,891, filed on Apr. 7, 2017 and 62/550,711, filed on Aug. 28, 2017; this application further claims the benefit of U.S. Provisional Patent Application Nos. 62/711,639, filed on Jul. 30, 2018 and 62/804,778, filed on Feb. 13, 2019; all of which are hereby incorporated by reference.

BACKGROUND OF THE INVENTION

1. Technical Field

The present invention relates to the field of energy storage devices, and more particularly, to electrolytes and electrolyte additives for lithium ion batteries.

2. Discussion of Related Art

Lithium ion batteries are used for a growing range of applications, as their safety and performance are improved. The electrolytes of lithium ion batteries are an important component that affects their safety and performance.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides lithium-ion batteries having electrolytes with additive(s) having dithioester functional group(s).

For example, one aspect of the present invention provides lithium ion battery comprising: at least one anode comprising active material based on Si, Ge and/or Sn, at least one cathode comprising active material based on at least one formulation comprising lithium Nickel-Manganese-Cobalt (NMC) and/or at least one formulation comprising modified Li-NMC ($Li_wNi_xMn_yCo_zO_2$) and/or at least one formulation comprising $LiMeO_2$ wherein Me comprises one or more of Ni, Co, Mn, Al and Li and O comprise one or more respective lithium and oxygen atoms, and/or at least one formulation comprising lithium Nickel Cobalt Aluminum oxide (NCA), and electrolyte comprising: solvent comprising at least one linear carbonate and/or ester and at least one cyclic carbonate and/or ester, at least one dissolved lithium salt, and at least one additive that is represented by formula (I):

wherein:

$Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety;

$Z^2$ is alkyl, haloalkyl, benzyl, aryl, cycloalkyl, alkenyl, alkynyl, heteroalicyclic, heteroaryl, a polymeric moiety, an oligomeric moiety or S—C(=S)—$Z^1$;

$R^1$-$R^2$ are each independently H, alkyl, haloalkyl, cycloalkyl, benzyl, aryl, heteroalicyclic, heteroaryl, polymeric moiety or an oligomeric moiety; and each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, O—P(=O)(OR$^1$)$_2$, trihalomethyl, S(=O)—R$^1$, S(=O)$_2$—R$^1$, S(=O)$_2$—NR$^1$R$^2$, halide, cycloalkyl, alkoxy, nitro, cyano, NR$^1$R$^2$, C(O)NR$^1$R$^2$, N(R$^1$)C(=O)—R$^2$, hydroxy, alkylthiol, thiol, arylthiol, heteroarylthiol, C(=O)—OR$^1$, C(=O)—R$^1$, aryl, aryloxy, heteroaryloxy or any combination thereof.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
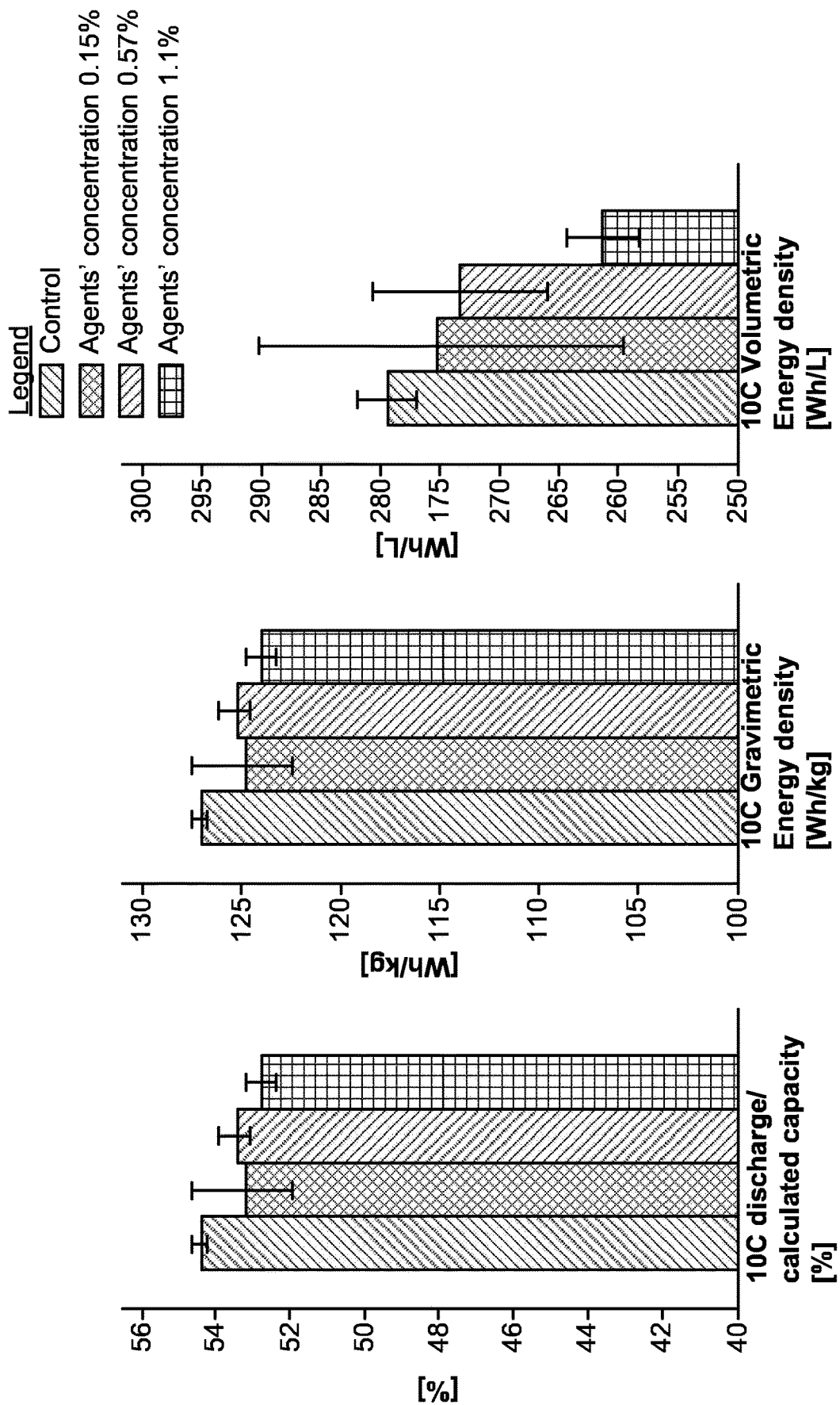
FIG. 1 provides experimental results indicating improvements achieved by using polymerization controlling agents as additives, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for improving the cycling lifetime of lithium ion batteries and thereby provide improvements to the technological field of energy storage.

Lithium ion batteries and electrolytes therefor are provided, which include electrolyte additives having dithioester functional group(s) that stabilize the SEI (solid-electrolyte interface) at the surfaces of the anode material particles, and/or stabilize the CEI (cathode electrolyte interface) at the surfaces of the cathode material particles, and/or act as oxygen scavengers to prevent cell degradation. The electrolyte additives having dithioester functional group(s) may function as polymerization controlling and/or chain transfer agents that regulate the level of polymerization of other electrolyte components, such as VC (vinyl carbonate) and improve the formation and operation of the batteries. The lithium ion batteries may have metalloid-based anodes—including mostly Si, Ge and/or Sn as anode active material particles.

In various embodiments of lithium-ion batteries, e.g., in batteries having metalloid-based anode materials, electrolytes may comprise olefinic additives such as VC and/or olefin moieties which are formed in-situ during cell formation and cycling. Examples for electrolyte are disclosed e.g., in U.S. Pat. No. 10,096,859, incorporated herein by reference in its entirety. In certain embodiments, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. patent application Ser. No. 16/243,190, incorporated herein by reference in its entirety.

During formation, olefins (of the olefin additives and/or of the olefin moieties) polymerize to poly-olefins (in radical polymerization) and are attached to the anode as part of the SEI. "Polymerization controlling agents", defined herein as compounds that control the chain length of the poly-olefins and/or stop olefin polymerization—may be added to the electrolyte. Non-limiting examples of polymerization controlling agents include radical scavengers and chain transfer agents.

Radical scavenger(s), used as such polymerization controlling agent, may be added to the electrolyte after the formation stage (at an electrolyte replenishment stage)—to stop olefin polymerization. For example, BHT (Butylated hydroxytoluene) and/or TEMPO ((2,2,6,6-Tetramethylpiperidin-1-yl)oxyl) may be added to the electrolyte after the formation stage.

Alternatively or complementarily, "chain transfer agents", defined herein as compounds comprising a weak bond (e.g. —C(=S)—S—moiety, i.e. a dithioester functional group) which facilitates a chain transfer reaction (usually within a polymerization process/reaction)—can be used as polymerization controlling agents, to control chain length of the poly-olefins. Non-limiting examples of chain transfer agents include dithioester compounds, thiols, haloalkanes (e.g. perfluoroiodoalkanes), organoselenium compounds (e.g. diphenyldisclenide), alkyl telluride compounds, organostibine compounds and iniferter agents (which simultaneously act as initiators, transfer agents, and terminators; e.g. dithiocarbamate compounds). In some embodiments, non-limiting examples of mechanisms involving the chain transfer agents include: reversible addition fragmentation chain transfer (RAFT, using e.g. the dithioester compounds), iodine transfer polymerization (ITP, using e.g. the perfluoroiodoalkanes), Selenium-centered radical-mediated polymerization (using the organoselenium compounds), Telluride-mediated polymerization (TERP, using e.g. the alkyl telluride compounds), stibine mediated polymerization (using the organostibine compounds) and controlled free radical iniferter polymerization (using iniferter agents).

Without being bound by any mechanism or theory, it is contemplated that polymerization controlling agents may be used to provide any of the following advantages: (i) control the chain lengths/molecular weights and distribution thereof, of the poly-olefins (e.g., poly-VC), (ii) prevent continuous occurrence of the reaction (which consumes electrolyte, reduces the ionic conductivity of the electrolyte and reduces the electronic conductivity of the anode material particles), and related parasitic reactions. Specifically, chain transfer agents (or comparable compounds and processes) and/or radical scavengers may be used to stop the polymerization at specified chain lengths that are optimized with respect to battery operation and performance with respect to any of their cycle life, charging/discharging rates, safety and/or capacity.

Without being bound by any mechanism or theory, at least some of the disclosed compounds may improve the cycling lifetime by at least partly providing a passivation or protection layer on cathode active material particles and/or on the cathode, stabilizing the CEI—cathode electrolyte interface.

Without being bound by any mechanism or theory, at least some of the disclosed compounds may oxidize before electrolyte components, anode components and/or cathode components oxidize, and so provide protection to any of these components. In certain embodiments, at least some of the disclosed compounds may operate as oxygen scavengers, removing $O_2$ that is left in the cell or that is being produced at small amounts during the operation of the cell before it damages other cell components.

It is noted that disclosed compounds may be used with cells comprising any of the anode types and cathode types listed above, as well as with various electrolyte compositions.

In certain embodiments, cells with high VC proportion and polymerization controlling agents were shown to increase cycling lifetime of the respective cells by 50-100%, providing a significant progress in the field of fast charging lithium ion batteries. For example, the results presented below indicate the efficiency of polymerization controlling agents in this respect.

As a non-limiting example of a polymerization controlling agent, the molecule RS-460, was used in the following experiment. In certain embodiments, various other polymerization controlling agents, may be used as additives, as disclosed below (e.g., formula (I) and (II)).

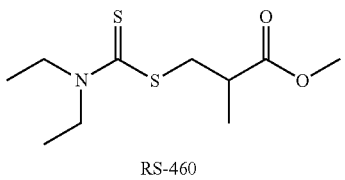

RS-460

It is emphasized that disclosed embodiments and the results are not bound by theory and are not limited to the operation mechanism of RS-460 as a polymerization controlling agent. In various embodiments, RS-460 and/or related compounds may be advantageous, e.g., for increasing the cycling lifetime of the respective batteries through any of a range of surface reactions involved in the process of the SEI (solid electrolyte interphase) layer, so that RS-460 may at least partly be used as an SEI-forming additive. Alternatively or complementarily, RS-460 may at least partly decompose and any of its decomposition products may be operative as an SEI-forming additive. In various embodiments, RS-460 and/or related compounds may be advantageous, e.g., in modifying electrolyte components in a different way than through the chain transfer mechanism, e.g., reacting with double bonds in electrolyte components such as VC and/or olefins, and/or by affecting reaction products of electrolyte components during SEI formation and/or with SEI components, e.g., by promoting polymerization of double bonds to change the chemical composition of the electrolyte and/or of the SEI. In certain embodiments, RS-460 and/or its decomposition products and/or related compounds may be advantageous, e.g., for preventing or attenuating various parasitic reactions (via degenerative radical state) in the electrolyte and/or in the SEI during battery formation and/or operation. In certain embodiments, RS-460 and/or related compounds may be advantageous, e.g., for scavenging various by-products of the reactions in the operating battery, such operating as an $H_2O$/HF scavenger. In certain embodiments, RS-460 and/or related compounds may be advantageous in electrochemical processes, in addition or in place of their advantages in chemical processes. For example, RS-460 and/or related compounds may affect the surface potential and/or the voltage during cell operation, and increase the cell cycling lifetime through electrochemical effects.

FIG. 1 provides experimental results indicating improvements achieved by using polymerization controlling agents as additives, according to some embodiments of the invention. The experiment was designed to contain four groups with different concentrations of polymerization controlling agents as additives. The first group, composed of three full cells, served as control, running at default parameters (1 Ah cells, 6.5 ml of EL 1255 electrolyte composed of 3/3.5/3.5 of VC(vinylene carbonate)/EB(ethyl butyrate)/BA(butyl acetate) and 1M $LiPF_6$, same formation and cycling schemes, see e.g., below, and 15 bar pressure applied to the pouches over metal plates) with no polymerization controlling agents as inhibitors. In the other three groups, each containing six full cell pouches (and an additional pouch that is run for half the cycling lifetime, used for understanding the degradation mechanisms), three different electrolyte concentrations of polymerization controlling agents as additives were used, namely 0.15%, 0.57% and 1.1%. The electrolyte was filled in two steps, before formation 5.6 ml of electrolyte were filled, with no inhibitors, for all groups, and after degassing additional 0.9 ml of electrolyte were added, with inhibitor concentration calculated to generate the final desired concentrations listed above. Other running parameters were the standard "zero-series" for all cells. The cells were assembled with standard parameters in C:A ratio range of 1.01-0.95, and calculated capacity range of 2178-2103 mAh and 6.5 ml of EL1255 electrolyte. In the formation procedure, the cells were charged up to 4V, at varying currents (typically starting at a very low current that corresponds to a charging rate of C/1000 and increasing the current as the cell charges and the voltage rises, carried out similarly for all cells), following a discharge at C/10 down to 3V. The first cycle was following by four cycles of CCCV (constant current followed by constant voltage) charging to 4V and discharging to 3V, both at C/2. The cycles were performed under plates with applied pressure of 15 bar and completed with degassing and addition of 0.9 ml of electrolyte with additive concentration calculated to generate the final desired concentration as disclosed above. Standard cycling was performed with CCCV charging at 8 C up to 4.3V and discharging down to 3V. The voltage range and the charging rate were adjusted according to the capacity retention percent until EoL (end of life) was reached at 80% retention.

The formation procedure was similar for the four groups, prior to the addition of the polymerization controlling agent. It was found that the addition of the polymerization controlling agent decreased the high C capacity in a gradual manner as illustrated in the figure below, yet even the cells in the highest polymerization controlling agent concentration run in a capacity within the spec (>51.5%). The different high C capacity was taken into account in the cycle life comparison presented below, as it is known that even a few percent difference has an effect on cycling.

The low volumetric energy density observed on the highest polymerization controlling agent concentration (1.1%) may be understood as a result of both the lower 10 C capacity and the larger thickness of the cells as described above.

Figure 2:
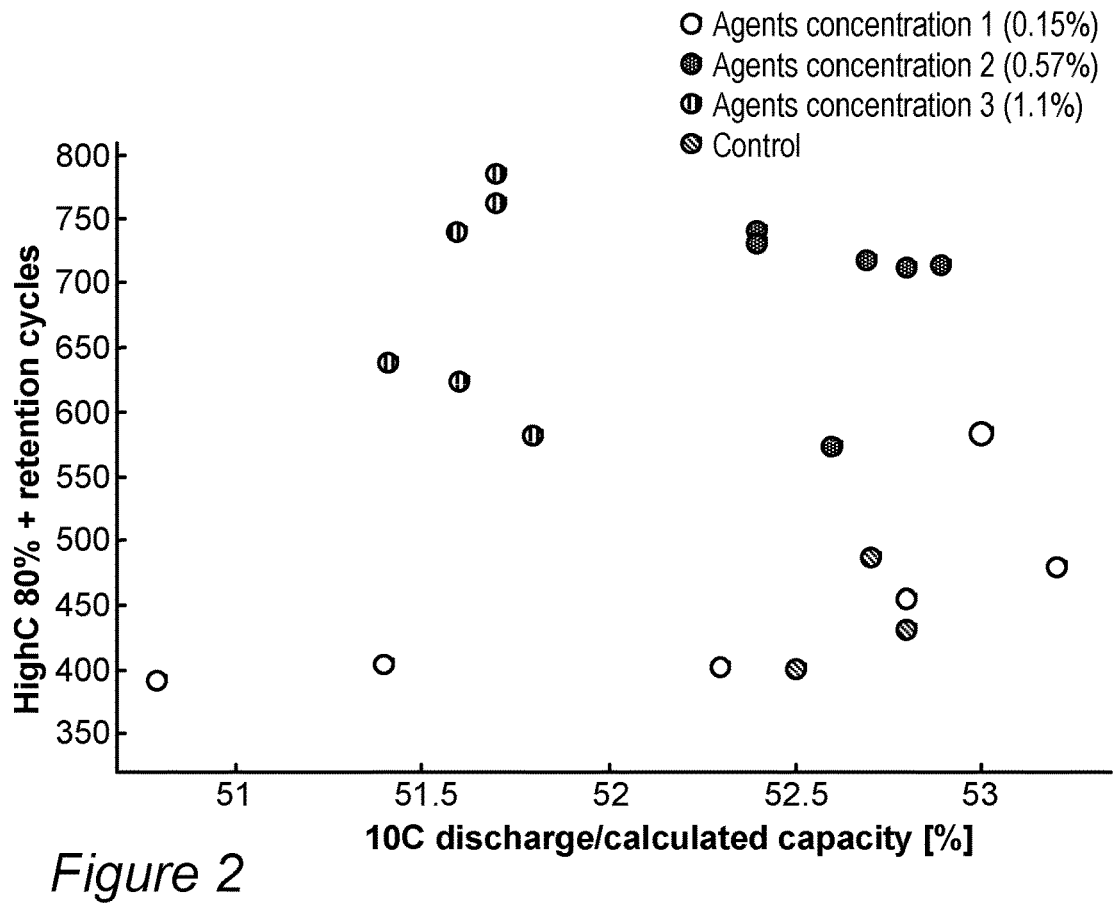
FIG. 2 provides a scatter plot of cycle life versus capacity for the experimental results, according to some embodiments of the invention.

FIG. 2 provides a scatter plot of cycle life versus capacity for the experimental results, according to some embodiments of the invention. It is noted that the medium polymerization controlling agent concentration group (0.57%) yielded the best results in terms of cycling rate and cycling life time. The group of cells with the highest polymerization controlling agent concentration (1.1%) seems to present better performance than the control cell group (0%) and the low polymerization controlling agent concentration groups (0.15%), which display similar performances with relatively low cycling lifetime. However, presently but no direct comparison is enabled due to capacity difference and possibly other differences.

Figure 3:
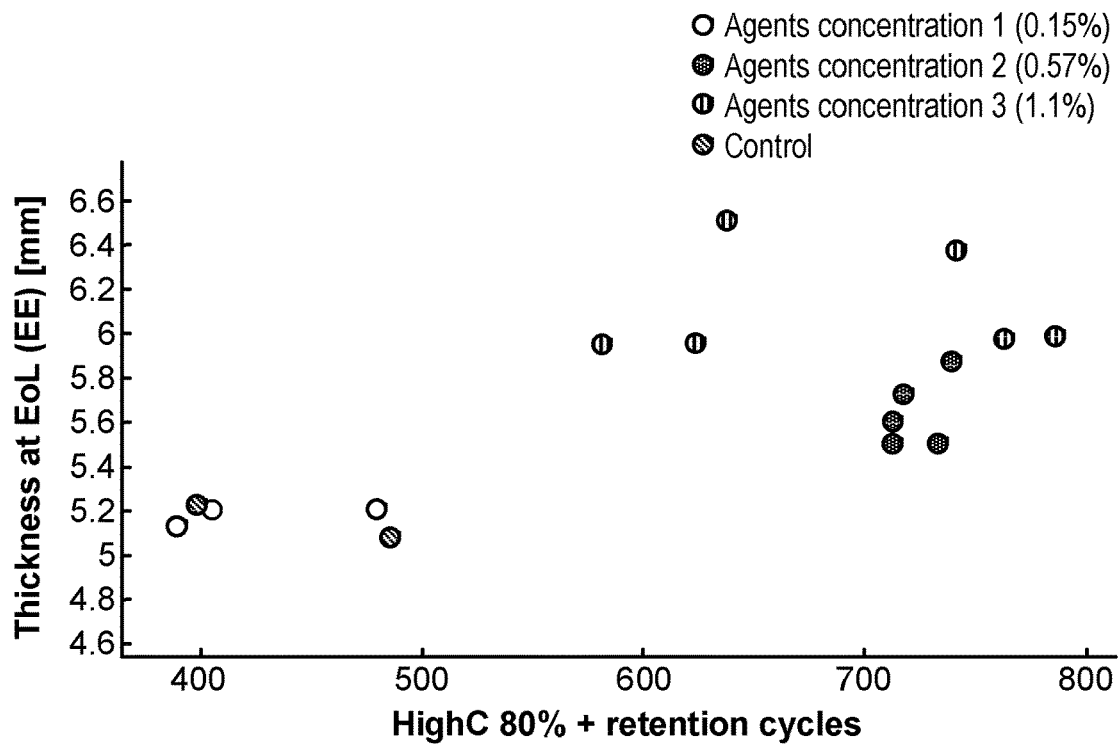
FIG. 3 provides a scatter plot of cell thickness versus cycle life for the experimental results, according to some embodiments of the invention.

FIG. 3 provides a scatter plot of cell thickness versus cycle life for the experimental results, according to some embodiments of the invention. The results show that cells with the medium polymerization controlling agent concentration (0.57%) swelled less than cells with the higher polymerization controlling agent concentration (1.1%), and both groups ran a similar and larger number cycles than cells from the two other groups that swelled less (and are not directly comparable with regard to swelling). In a detailed examination of the individual pouches with respect to the number of cycles indicates no specific effect of the addition of polymerization controlling agent on the swelling of the pouches.

In conclusion, pouches with the medium and high polymerization controlling agent concentration of 0.57% and 1.1% displayed considerably longer cycling lifetimes, by ca. 55%, compared to the control group (without polymerization controlling agents) and compared to the group with lower polymerization controlling agent concentration (0.15%). The group with medium polymerization controlling agent concentration (0.57%) exhibited higher capacity than the group with high polymerization controlling agent concentration (1.1%).

The inventors suggest the following possible modifications of RS-460 that may retain its activity as polymerization controlling agent, possibly with different effective concentrations. In one embodiment, the polymerization controlling agents are dithioester compounds that may comprise molecules of the formula (I):

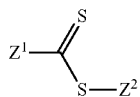

wherein:
$Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety;
$Z^2$ is alkyl, haloalkyl, benzyl, aryl, cycloalkyl, alkenyl, alkynyl, heteroalicyclic, heteroaryl, a polymeric moiety, an oligomeric moiety or S—C(=S)—$Z^1$;
$R^1$-$R^2$ are each independently H, alkyl, haloalkyl, cycloalkyl, benzyl, aryl, heteroalicyclic, heteroaryl, polymeric moiety or an oligomeric moiety 1; and
each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, O—P(=O)($OR^1$)$_2$, trihalomethyl, S(=O)—$R^1$, S(=O)$_2$—$R^1$, S(=O)$_2$—$NR^1R^2$, halide, cycloalkyl, alkoxy, nitro, cyano, $NR^1R^2$, C(O)$NR^1R^2$, N($R^1$)C(=O)—$R^2$, hydroxy, alkylthiol, thiol, arylthiol, heteroarylthiol, C(=O)—$OR^1$, C(=O)—R', aryl, aryloxy, heteroaryloxy or any combination thereof.

In certain embodiments, $Z^2$ may be a carbon chain, e.g., alkyl, haloalkyl, aryl, alkenyl, alkynyl, a polymeric moiety having a carbon chain or an oligomeric moiety having a carbon chain.

In certain embodiments, $Z^1$ may be an electron donating group, e.g., heteroaryl, heteroalicyclic, hydroxyl, alkoxy, aryloxy, heteroaryloxy, $NR^1R^2$, thiol, arylthiol, alkylthiol, heteroarylthiol, a polymeric moiety with an electron donating group or an oligomeric moiety with an electron donating group.

In another embodiment, the dithioester compounds may comprise molecules of the formula (Ia):

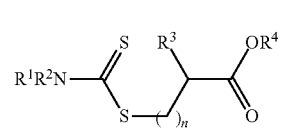

wherein
$R^1$ and $R^2$ are each independently H, alkyl, haloalkyl, cycloalkyl, aryl, heteroalicyclic, benzyl, heteroaryl, polymeric moiety or an oligomeric moiety or $R^1$, $R^2$ and the adjacent nitrogen form a heteroaryl or a heteroalicyclic ring;
$R^3$ is H, alkyl, haloalkyl, alkenyl, alkynyl, cycloalkyl, aryl, heteroalicyclic heteroaryl, alkoxy, hydroxy, O—P(=O)($OR^1$)$_2$, thiol, alkylthiol, aryloxy, heteroaryloxy, arylthiol, heteroarylthiol, nitro, halide, trihalomethyl, cyano, benzyl, C(O)$NR^1R^2$, NR'$R^2$, N($R^1$)C(=O)—$R^2$, C(=O)—$OR^1$, S(=O)—$R^1$, S(=O)$_2$—$R^1$ or S(=O)$_2$—$NR^1R^2$;
$R^4$ is H, alkyl, haloalkyl, cycloalkyl, aryl, heteroalicyclic, benzyl or heteroaryl; each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $R^1$, $R^2$, $R^3$ or $R^4$ is optionally substituted with one or more of alkyl, haloalkyl, alkenyl, alkynyl, heteroalicyclic, heteroaryl, O—P(=O)($OR^1$)$_2$, trihalomethyl, cyano, S(=O)—$R^1$, S(=O)$_2$—R', S(=O)$_2$—$NR'R^2$, halide, cycloalkyl, alkoxy, nitro, NR'$R^2$, C(O)$NR'R^2$, N($R^1$)C(=O)—$R^2$, hydroxy, alkylthiol, thiol, arylthiol, heteroarylthiol, C(=O)—$OR^1$, C(=O)—$R^1$, aryl, aryloxy, heteroaryloxy or any combination thereof; and n is an integer between 1 and 10.

In one embodiment, the dithioester compounds may comprise molecules of the formula (II):

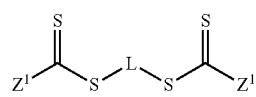

wherein
$Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety;
$R^1$ and $R^2$ are each independently H, alkyl, haloalkyl, cycloalkyl, aryl, heteroalicyclic, benzyl, heteroaryl, polymeric moiety or an oligomeric moiety or $R^1$, $R^2$ and the adjacent nitrogen form a heteroaryl or a heteroalicyclic ring;
each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $Z^1$, $R^1$ or $R^2$ is optionally substituted with one or more of alkyl, haloalkyl, alkenyl, alkynyl, heteroalicyclic, heteroaryl, O—P(=O)($OR^1$)$_2$, trihalomethyl, cyano, S(=O)—$R^1$, S(=O)$_2$—$R^1$, S(=O)$_2$—$NR^1R^2$, halide, cycloalkyl, alkoxy, nitro, $NR^1R^2$, C(O)$NR^1R^2$, N($R^1$)C(=O)—$R^2$, hydroxy, alkylthiol, thiol, arylthiol, heteroarylthiol, C(=O)—OR¹, C(=O)—R¹, aryl, aryloxy, heteroaryloxy or any combination thereof; and
L is a linker.

In another embodiment, the dithioester compounds may comprise molecules of the formula (IIa):

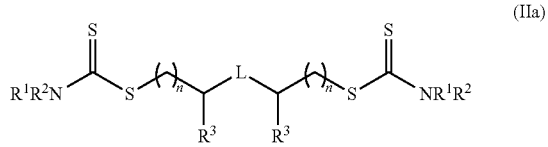

(IIa)

wherein
R¹ and R² are each independently H, alkyl, haloalkyl, cycloalkyl, aryl, heteroalicyclic, benzyl, heteroaryl, polymeric moiety or an oligomeric moiety or R¹, R² and the adjacent nitrogen form a heteroaryl or a heteroalicyclic ring;
R³ is H, alkyl, haloalkyl, alkenyl, alkynyl, cycloalkyl, aryl, heteroalicyclic heteroaryl, alkoxy, hydroxy, O—P(=O)(OR¹)₂, thiol, alkylthiol, aryloxy, heteroaryloxy, arylthiol, heteroarylthiol, nitro, halide, trihalomethyl, cyano, benzyl, C(O)NR¹R², NR¹R², N(R¹)C(=O)—R², C(=O)—OR¹, S(=O)—R¹, S(=O)₂—R¹ or S(=O)₂—NR¹R²;
each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of R¹, R² or R³ is optionally substituted with one or more of alkyl, haloalkyl, alkenyl, alkynyl, heteroalicyclic, heteroaryl, O—P(=O)(OR¹)₂, trihalomethyl, cyano, S(=O)—R¹, S(=O)₂—R¹, S(=O)₂—NR¹R², halide, cycloalkyl, alkoxy, nitro, NR¹R², C(O)NR¹R², N(R¹)C(=O)—R², hydroxy, alkylthiol, thiol, arylthiol, heteroarylthiol, C(=O)—OR¹, C(=O)—R¹, aryl, aryloxy, heteroaryloxy or any combination thereof;
L is a linker; and
n each is independently an integer between 1 and 10.

In another embodiment, the dithioester compounds may comprise molecules of the formula (IIb):

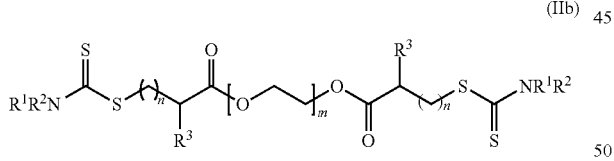

(IIb)

wherein
R¹ and R² are each independently H, alkyl, haloalkyl, cycloalkyl, aryl, heteroalicyclic, benzyl, heteroaryl, polymeric moiety or an oligomeric moiety or R¹, R² and the adjacent nitrogen form a heteroaryl or a heteroalicyclic ring;
R³ is H, alkyl, haloalkyl, alkenyl, alkynyl, cycloalkyl, aryl, heteroalicyclic heteroaryl, alkoxy, hydroxy, O—P(=O)(OR¹)₂, thiol, alkylthiol, aryloxy, heteroaryloxy, arylthiol, heteroarylthiol, nitro, halide, trihalomethyl, cyano, benzyl, C(O)NR¹R², NR¹R², N(R¹)C(=O)—R², C(=O)—OR¹, S(=O)—R¹, S(=O)₂—R¹ or S(=O)₂—NR'R²;
each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of R', R² or R³ is optionally substituted with one or more of alkyl, haloalkyl, alkenyl, alkynyl, heteroalicyclic, heteroaryl, O—P(=O)(OR¹)₂, trihalomethyl, cyano, S(=O)—R¹, S(=O)₂—R¹, S(=O)₂—NR¹R², halide, cycloalkyl, alkoxy, nitro, NR¹R², C(O)NR¹R², N(R¹)C(=O)—R², hydroxy, alkylthiol, thiol, arylthiol, heteroarylthiol, C(=O)—OR¹, C(=O)—R', aryl, aryloxy, heteroaryloxy or any combination thereof;

m is an integer between 1 and 10,000; and
n each is independently an integer between 1 and 10.

In another embodiment, non-limiting examples of dithioester compounds include the following:

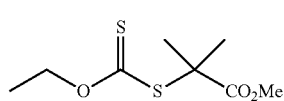

1

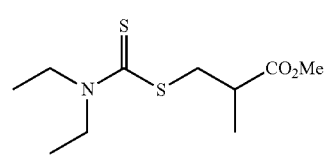

1a

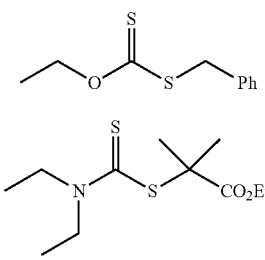

1b

1C

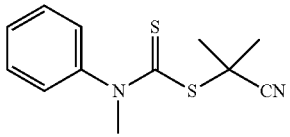

2

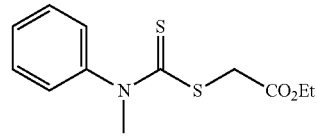

3

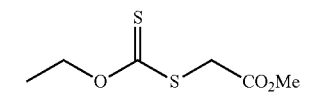

4

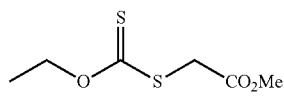

5

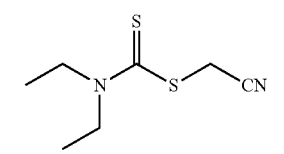

6

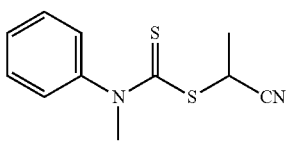

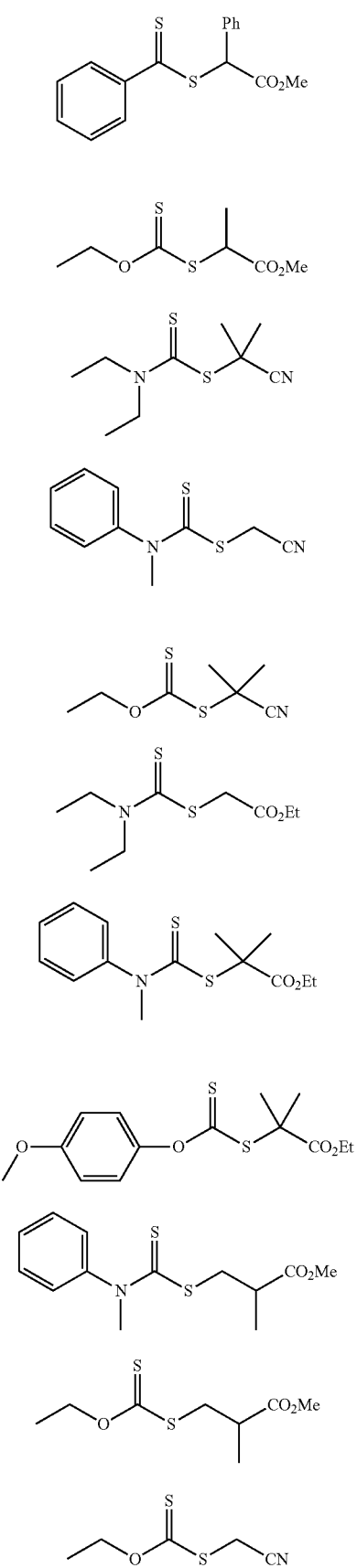
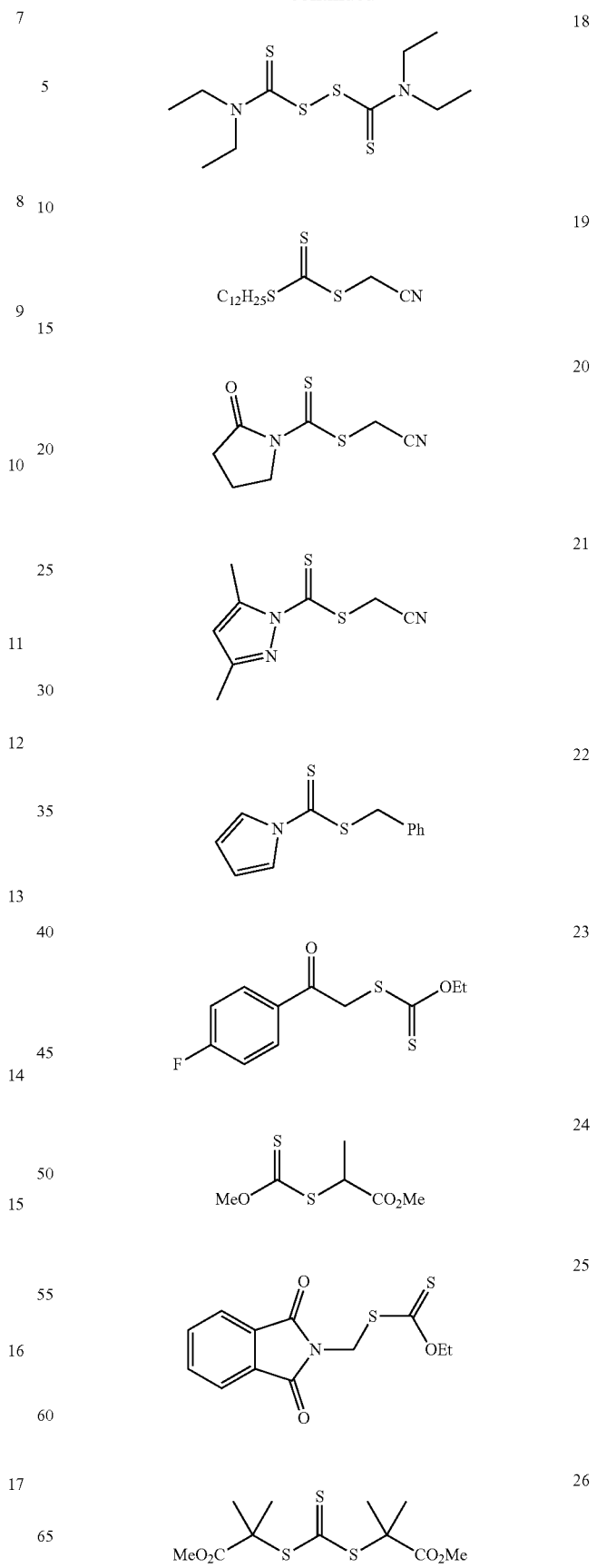

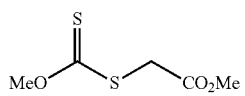

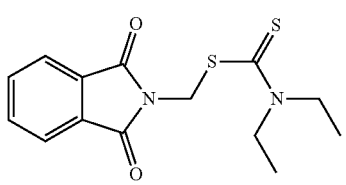

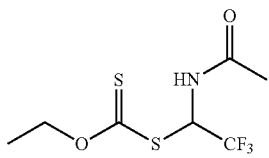

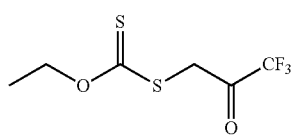

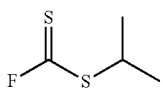

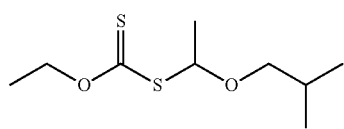

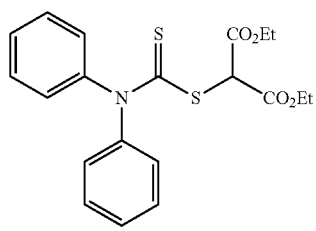

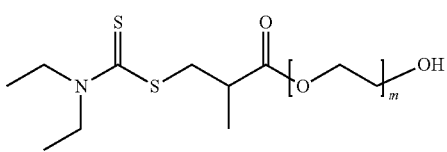

wherein m is an integer between 1 and 10,000.

In one embodiment, the dithioester compounds are polymeric, oligomeric or dendritic compounds comprising a polymeric, oligomeric or dendrimeric core and multiple dithioester moieties "arms" attached to the core, as may be represented by the following formula (III):

$$\text{core} \left[ \begin{array}{c} S \\ \diagdown \\ S \end{array} Z^1 \right]_p \quad (III)$$

wherein the core is a dendritic, oligomeric or polymeric moiety, e.g., having a carbon chain such as polyamide chains, polyester chains, or polyethylene chains;

$Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety;

$R^1$ and $R^2$ are each independently H, alkyl, haloalkyl, cycloalkyl, aryl, heteroalicyclic, benzyl, heteroaryl, polymeric moiety or an oligomeric moiety or $R^1$, $R^2$ and the adjacent nitrogen form a heteroaryl or a heteroalicyclic ring;

each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $Z^1$, $R^1$ or $R^2$ is optionally substituted with one or more of alkyl, haloalkyl, alkenyl, alkynyl, heteroalicyclic, heteroaryl, $O-P(=O)(OR^1)_2$, trihalomethyl, cyano, $S(=O)-R^1$, $S(=O)_2-R^1$, $S(=O)_2-NR^1R^2$, halide, cycloalkyl, alkoxy, nitro, $NR^1R^2$, $C(O)NR^1R^2$, $N(R^1)C(=O)-R^2$, hydroxy, alkylthiol, thiol, arylthiol, heteroarylthiol, $C(=O)-OR^1$, $C(=O)-R^1$, aryl, aryloxy, heteroaryloxy or any combination thereof; and p is an integer between 3 and 1000.

In another embodiment, the polymeric, oligomeric or dendritic compounds are represented by the following non-limiting examples:

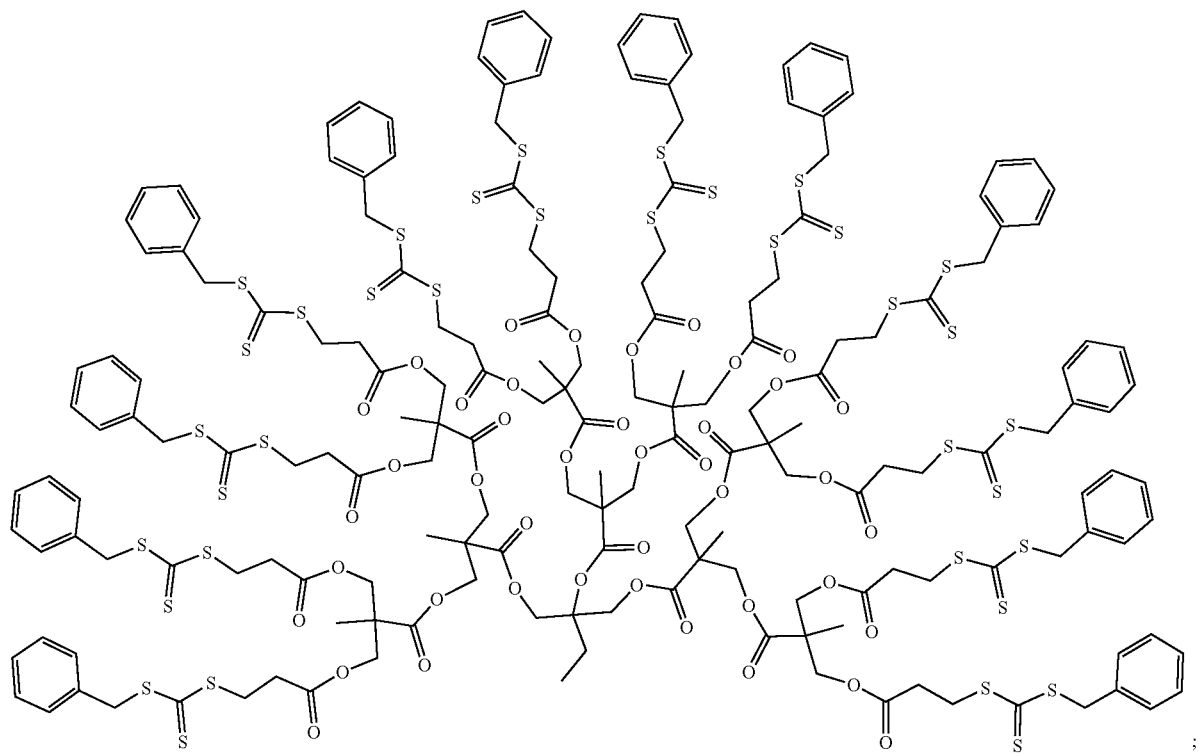
;
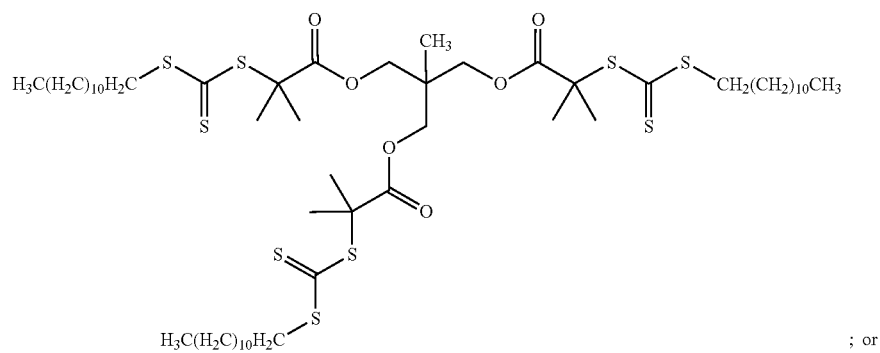
; or
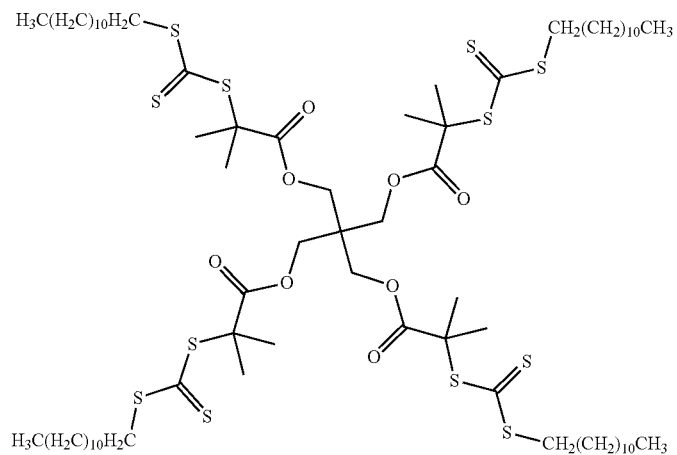

Alternative known chain transfer agents and corresponding modifications may also be used to achieve increased cycling lifetime of the respective cells.

Definitions

In some embodiments, $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety. Each possibility represents a separate embodiment of this invention.

In some embodiments, $Z^2$ is alkyl, haloalkyl, benzyl, aryl, cycloalkyl, alkenyl, alkynyl, heteroalicyclic, heteroaryl, a polymeric moiety, an oligomeric moiety or S—C(=S)—$Z^1$. Each possibility represents a separate embodiment of this invention.

In some embodiments, $R^1$-$R^2$ are each independently H, alkyl, haloalkyl, benzyl, cycloalkyl, aryl, heteroalicyclic, heteroaryl, a polymeric moiety or an oligomeric moiety. In certain embodiments, if nitrogen (N) is adjacent to $R^1$ and $R^2$ then $R^1$, $R^2$ and the adjacent nitrogen form a heteroaryl or a heteroalicyclic ring. Each possibility represents a separate embodiment of this invention.

In some embodiments, $R^3$ is H, alkyl, haloalkyl, alkenyl, alkynyl, cycloalkyl, aryl, heteroalicyclic heteroaryl, alkoxy, hydroxy, O—P(=O)(O$R^1$)$_2$, thiol, alkylthio, aryloxy, heteroaryloxy, arylthiol, heteroarylthiol, nitro, halide, trihalomethyl, cyano, benzyl, $NR^1R^2$, C(O)$NR^1R^2$, N($R^1$)C(=O)—$R^2$, C(=O)—O$R^1$, S(=O)—$R^1$, S(=O)$_2$—$R^1$ or —S(=O)$_2$—$NR^1R^2$. Each possibility represents a separate embodiment of this invention.

In some embodiments, $R^4$ is H, alkyl, haloalkyl, cycloalkyl, aryl, heteroalicyclic, benzyl or heteroaryl. Each possibility represents a separate embodiment of this invention.

In some embodiments, L is a linker which is at least one of: a polymeric moiety, an oligomeric moiety, a functional group or any combination thereof where the polymeric moiety, oligomeric moiety and the functional group are as defined herein below. Each possibility represents a separate embodiment of this invention.

In some embodiments, the core is a dendritic, oligomeric or polymeric moiety, where the dendritic moiety, oligomeric moiety and polymeric moiety are as defined herein below. Each possibility represents a separate embodiment of this invention.

In some embodiments, the term "alkyl" comprises an aliphatic hydrocarbon including straight chain and branched chain groups. Preferably, the alkyl group has 1 to 100 carbon atoms, 1-10 carbon atoms, 10-20 carbon atoms, 20-30 carbon atoms, 30-40 carbon atoms, 40-50 carbon atoms, 50-60 carbon atoms, 60-70 carbon atoms, 70-80 carbon atoms, 80-90 carbon atoms or 90-100 carbon atoms. Whenever a numerical range; e.g., "1-100", is stated herein, it implies that the group, in this case the alkyl group, may contain 1 carbon atom, 2 carbon atoms, 3 carbon atoms, etc., up to and including 100 carbon atoms. In certain embodiments, an alkyl group may be substituted or unsubstituted by one or more substituents. Each possibility represents a separate embodiment of this invention.

In some embodiments, the term "alkenyl" refers to an unsaturated alkyl, as defined herein, having at least two carbon atoms and at least one carbon-carbon double bond. In certain embodiments, an alkenyl group may be substituted or unsubstituted by one or more substituents. Each possibility represents a separate embodiment of this invention.

In some embodiments, the term "alkynyl" refers to an unsaturated alkyl having at least two carbon atoms and at least one carbon-carbon triple bond. In certain embodiments, an alkynyl group may be substituted or unsubstituted by one or more substituents. Each possibility represents a separate embodiment of this invention.

In some embodiments, the term "cycloalkyl" refers to an all-carbon monocyclic or fused ring (e.g., rings which share an adjacent pair of carbon atoms) group where one or more of the rings does not have a completely conjugated pi-electron system. In certain embodiments, a cycloalkyl group may be substituted or unsubstituted by one or more substituents. Each possibility represents a separate embodiment of this invention.

In some embodiments, the term "aryl" refers to an all-carbon monocyclic or fused-ring polycyclic (e.g., rings which share adjacent pairs of carbon atoms) groups having a completely conjugated pi-electron system. In certain embodiments, an aryl group may be substituted or unsubstituted by one or more substituents. Each possibility represents a separate embodiment of this invention.

In some embodiments, the term "heteroaryl" refers to a monocyclic or fused ring (e.g., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include succinimide, pyrrole (e.g. 1H-pyrrole or 2H-pyrrole), indole, furan, thiophene, thiadiazole, imidazole, oxazole, thiazole, pyrazole, pyridine, pyrimidine, pyrrolidone (e.g. 2-pyrrolidone or 3-pyrrolidone), quinoline, isoquinoline and purine. The heteroaryl group may be substituted or unsubstituted by one or more substituents. Each possibility represents a separate embodiment of this invention.

In some embodiment, the term "heteroalicyclic" or "heterocyclyl" refers to a monocyclic or fused ring group having in the ring(s) one or more atoms such as nitrogen, oxygen and/or sulfur. The rings may also have one or more double bonds. In certain embodiments, the rings do not have a completely conjugated pi-electron system. Examples, without limitation, include: piperidine, piperazine, tetrahydrofuran, tetrahydropyran, morpholine and the like. The heteroalicyclic or heterocyclyl group may be substituted or unsubstituted by one or more substituents. Each possibility represents a separate embodiment of this invention.

In some embodiments, the term "polymeric moiety" refers to a moiety comprising a polymeric chain and optionally one or more functional groups, defined hereinbelow, linked to the polymeric chain. In one embodiment, the polymeric chain is substituted or unsubstituted by one or more substituents. In one embodiment, the polymeric moiety is a linker or a part of a linker, i.e. it's connected from both sides of the moiety (see polyethylene glycol (PEG) examples below for illustration). In one embodiment, the polymeric moiety is connected from only one side (see polyethylene glycol (PEG) examples below for illustration). In one embodiment, non-limiting examples of polymers include: polyethylene glycol (PEG), polyacrylic acid (PAA), polysaccharides, polypeptides, polynucleotides, polyalkylamines and polysilanes. In another embodiment, non-limiting examples of polysaccharides include: cellulose, starch, glycogen, chitin, amylose and amylopectin. In another embodiment, non-limiting examples of polypeptides include polylysine, polyarginine, polyglycine, polyalanine, cathelicidins, eledoisin and calcitonin. In another embodiment, non-limiting examples of polynucleotides include: RNA and DNA. In another embodiment, non-limiting examples of polyalkylamines include linear and branched polyethylene imines. In another embodiment, non-limiting examples of polysilanes include polydimethylsiloxane (PDMS) and polymethylhydrosiloxane. Each possibility represents a separate embodiment of this invention. In one embodiment, the polymer is a homopolymer or copolymer of the polymers as described hereinabove. In one embodiment, the number of repeating units in one polymeric chain is above 5. In another embodiment, the number of repeating units is 6-10. In another embodiment, the number of repeating units is 10-20. In another embodiment, the number of repeating units is 20-50. In another embodiment, the number of repeating units is 50-100. In another embodiment, the number of repeating units is 100-500. In another embodiment, the number of repeating units is 500-1,000. In another embodiment, the number of repeating units is 1,000-5,000. In another embodiment, the number of repeating units is 5,000-10,000. In another embodiment, the number of repeating units is 10,000-50,000. In another embodiment, the number of repeating units is 50,000-100,000. In another embodiment, the number of repeating units is 100,000-500,000. Each possibility represents a separate embodiment of this invention. In another embodiment, the polymeric moiety is

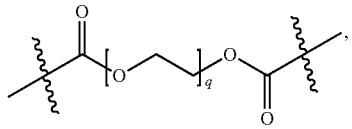

where q is an integer between 6 and 10,000. In another embodiment, the polymeric moiety is

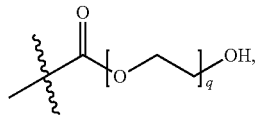

where q is an integer between 6 and 10,000.

In some embodiments, non-limiting examples of functional groups include —O— (ether), —S— (thioether), —O—C(=O)— (ester), —S—C(=S)— (dithioester), —NR$^1$— (amine), —NR$^1$C(=O)— (amide), —(CR$^1$R$^2$)$_n$— (alkylene), —(C(halide)$_2$)$_n$— (haloalkylene), —S(=O)— (sulfoxide), —S(=O)$_2$— (sulfone), substituted or unsubstituted arylene, substituted or unsubstituted heteroarylene, substituted or unsubstituted cycloalkylene and substituted or unsubstituted heterocyclylene where n is an integer between 1 and 10, R$^1$ and R$^2$ are as defined hereinabove and arylene, heteroarylene, cycloalkylene and heterocyclylene correspond to the hereinabove definitions of aryl, heteroaryl, cycloalkyl and heterocyclyl, respectively. Each possibility represents a separate embodiment of this invention.

In some embodiments, the term "oligomeric moiety" refers to a moiety comprising an oligomeric chain and optionally one or more functional groups, defined hereinabove, linked to the oligomeric chain. In one embodiment, the oligomeric moiety is substituted or unsubstituted by one or more substituents. In one embodiment, the oligomeric moiety is a linker or a part of a linker, i.e. it's connected from both sides of the moiety (see oligoethylene glycol examples below for illustration). In one embodiment, the oligomeric moiety is connected from only one side (see oligoethylene glycol examples below for illustration). In one embodiment, non-limiting examples of oligomers include the same monomers of the polymers as described hereinabove, i.e. ethylene glycol (EG), acrylic acid (PAA), saccharides, peptides, nucleotides, alkylamines and silanes, where the number of repeating units in one oligomeric chain is 2-5. Each possibility represents a separate embodiment of this invention. In another embodiment, the oligomeric moiety is

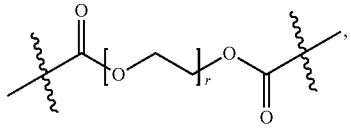

where r is an integer between 2 and 5. In another embodiment, the oligomeric moiety is

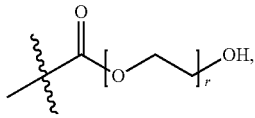

where r is an integer between 2 and 5.

In some embodiments, a dendritic core or a dendrimeric moiety, is defined as repetitively branched molecular moiety. In one embodiment, the dendritic moiety has an atom center (e.g. carbon atom) or a molecular center (e.g. adamantane), where such center is multiply substituted with branches (or "arms") such as functionalized (e.g. with esters or ethers) alkyls and each of these branches is further multiply substituted with identical/other branches; this multiple substitution/functionalization occurs at least once in the smallest dendritic moiety (i.e. carbon with 4 arms) and may occur more than once, when each such substitution/functionalization is referred to as "generation" (i.e. one functionalization of e.g. carbon, the initiator, resulting in tetra-functionalized methane—is a zero generation; subsequent full functionalization of all these four branches with additional branches will result in 12 branches as the first generation and so on). Each possibility represents a separate embodiment of this invention.

In some embodiments, the term "alkoxy" refers to —O-alkyl or an —O-cycloalkyl group and the term "alkylthiol" describes an —S-alkyl or an —S-cycloalkyl group, where alkyl and cycloalkyl are as defined hereinabove. In certain embodiments, the term "aryloxy" and "heteroaryloxy" describe an —O-aryl and an —O-heteroaryl groups, respectively and the term "arylthiol" and "heteroarylthiol" describe an —S-aryl and an —S-heteroaryl groups, where aryl and heteroaryl are as defined hereinabove.

In some embodiments, "halide", "halogen" or "halo" refer to fluorine, chlorine, bromine or iodine.

In some embodiments, the term "haloalkyl" refers to alkyl substituted with at least one halide where alkyl and halide are as defined hereinabove. The haloalkyl group may be substituted or unsubstituted by one or more substituents other than halides. Non-limiting examples of haloalkyl include CF$_3$, CF$_2$CF$_3$, CH$_2$CF$_3$, CCl$_3$, CCl$_2$CCl$_3$, CH$_2$CCl$_3$, CH$_2$CH$_2$CF$_3$, CH$_2$CF$_2$CF$_3$ and CF$_2$CF$_2$CF$_3$. Each possibility represents a separate embodiment of this invention.

In some embodiments, the term "hydroxy" refers to —OH group and the term "thiol" describes a —SH group.

In some embodiments, the term "nitro" group refers to a —NO$_2$ group.

In some embodiments, the term "cyano" or "nitrile" group refers to a —C≡N group.

In some embodiments, non-limiting examples for substituents include: alkyl, haloalkyl, alkenyl, alkynyl, heteroalicyclic, heteroaryl, O—P(=O)(OR$^1$)$_2$, trihalomethyl, S(=O)—R$^1$, S(=O)$_2$—R$^1$, S(=O)$_2$—NR$^1$R$^2$, halide, cycloalkyl, alkoxy, nitro, NR$^1$R$^2$, C(O)NR$^1$R$^2$, N(R$^1$)C(=O)—R$^2$, hydroxy, alkylthiol, thiol, arylthiol, heteroarylthiol, C(=O)—OR$^1$, C(=O)—R$^1$, aryl, aryloxy, heteroaryloxy or any combination thereof. Each possibility represents a separate embodiment of this invention.

In certain embodiments, VC or poly-VC may be added to the anode slurry and/or to the binder, to reduce electrolyte consumption and to improve control of the poly-VC chain lengths. Poly-VC may build an artificial SEI on the anode material particles even before, or during formation. In such embodiments, the electrolyte may have less VC (e.g., 5%, 10%, 20%), to reduce its viscosity. Poly-VC for the anode slurry (or binder) may be prepared with polymerization controlling agent to control the molecular weights of the chains (chain length). Electrolyte modifications and anode modifications may be combined and optimized.

In certain embodiments, sacrificial lithium salts may be used in the electrolyte during the formation stage, and/or as part of the anode slurry and/or the cathode formulation—to compensate for lithium losses during the formation stage (e.g., caused by SEI formation) and to increase the energy density. Disclosed lithium salts may enhance lithium content in the electrolyte and/or in the anode and/or in the cathode (e.g., having higher lithium density than respective cathode materials), and possibly be removed as gaseous compounds such as N$_2$, CO$_2$, CO, COS, etc. at a degassing stage after cell formation cycles. Advantageously, removal of the supporting molecular structure (that binds the lithium in the salt) by degassing reduces the volume of non-active material in the cell.

Suggested sacrificial lithium salts include any of the following, substituted or un-substituted, as well as derived compounds: Lithium azodicarboxylate, Lithium bicarbonate R—C(=S)SLi, R—C(=O)SLi, R—C(=S)OLi and Lithium sulfinates, R—SO$_2$Li, where R is e.g., alkyl, haloalkyl, cycloalkyl, carbonyl (e.g., formyl CHO, alkyl or aryl carbonyls with various residues), thiocarbonyl (e.g., thioformyl CHS, alkyl or aryl thiocarbonyls with various residues), aryl, NR$^1$R$^2$, thiol, arylthiol, alkylthiol, heteroarylthiol, heteroalicyclic or heteroaryl; and where alkyl, haloalkyl, cycloalkyl, caroyl, thiocarboyl, aryl, NR$^1$R$^2$, thiol, arylthiol, alkylthiol, heteroarylthiol, heteroalicyclic or heteroaryl are defined hereinabove.

Non-limiting examples for sacrificial lithium salts include:

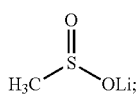
39

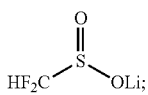
40

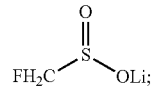
41

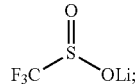
42

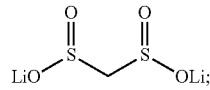
43

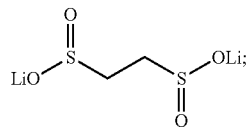
44

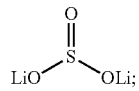
45

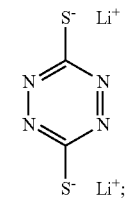
46

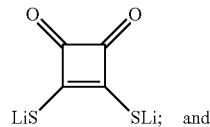
47
and

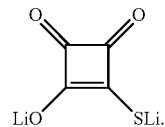
48

In certain embodiments, any one or more of the oxygen atoms may be exchanged by a sulfur atom.

Non-limiting examples for Lithium azodicarboxylate and Lithium bicarbonate include, respectively:

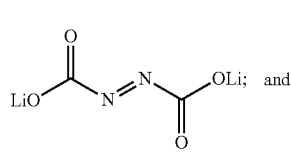
49
and

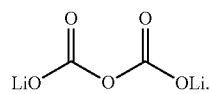
50

In certain embodiments, Li-poly-aspartate (PAsp) may be used instead of, or in addition to, Li-polyacrylate (PAAc) as binder—for Ge, SiSn and possibly graphite anode materials. PAsp is advantageous in that it is environmentally friendly, and possibly improves performance with respect to PAA.

Piezoelectric binders may be used to improve the accommodation of the expanding active material particle within the binder. Optionally, piezoelectric binders may be selected to expand mechanically at voltages corresponding to the lithiation voltage of the anode material particles.

Alternatively or complementarily, piezoelectric binders may be selected so that the mechanical pressure applied by the expanding anode material particle on the binder reduces the anode voltage—allowing extra-charging.

Combinations of the ideas disclosed above may be modified and optimized to improve the operation and/or performance of lithium ion batteries with respect to any of their cycle life, charging/discharging rates, safety and/or capacity.

Any of the disclosed embodiments may be implemented in lithium ion batteries to improve their cycle life, charging/discharging rates, safety and/or capacity. Lithium ion batteries typically comprise anodes and cathodes with current collectors affixed thereto, packed with electrolyte and separator(s) in a battery pouch. Anodes are typically made of anode material particles, conductive additive(s) and binder(s), and may comprise any of the anode configurations taught, e.g., by U.S. Patent Publication No. 2017/0294687, incorporated herein by reference in its entirety. For example, anodes may be based on graphite, graphene or metalloid anode material such as Si, Ge, Sn and their combinations. Cathodes may comprise lithium metal oxide (LiMeO), when Me can be one or several metals selected from Ni, Co, Mn and Al. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films thereof, woven or non-woven fabrics etc. may be used as separator(s), as well as possibly composite materials including, e.g., alumina, zirconia, titania, magnesia, silica and calcium carbonate along with various polymer components as listed above.

In any of the disclosed embodiments, electrolytes may comprise solvent comprising at least one linear carbonate and/or ester and at least one cyclic carbonate and/or ester, at least one dissolved lithium salt, and at least one additive as disclosed herein, e.g., having dithioester functional group(s). For example, in certain embodiments, electrolytes may be based on liquid electrolytes, typically linear and cyclic carbonates, such as EC (ethylene carbonate), DEC (diethyl carbonate), PC (propylene carbonate), VC (vinylene carbonate), FEC (fluoroethylene carbonate), EA (ethyl acetate), EB (ethyl butyrate), BA (butyl acetate), EMC (ethyl methyl carbonate), DMC (dimethyl carbonate) and combinations thereof and/or solid electrolytes such as polymeric electrolytes such as polyethylene oxide, fluorine-containing polymers and copolymers (e.g., polytetrafluoroethylene), and combinations thereof. Electrolytes may comprise lithium electrolyte salt(s) such as $LiPF_6$, $LiBF_4$, lithium bis(oxalato) borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety.

Disclosed lithium ion batteries may be configured, e.g., by selection of materials, to enable operation at high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A lithium ion battery comprising:
   at least one anode comprising active material based on Si, Ge and/or Sn,
   at least one cathode comprising active material based on at least one formulation comprising lithium iron-phosphorus (LFP) oxide or lithium metal oxide (LiMeO), wherein Me is one or more metal selected from nickel, cobalt, manganese and aluminum and Li and 0 represent one or more respective lithium and oxygen atoms, and
   electrolyte comprising:
   solvent comprising at least one linear carbonate and/or ester and at least one cyclic carbonate and/or ester,
   at least one dissolved lithium salt, and
   at least one additive that is represented by formula (I):

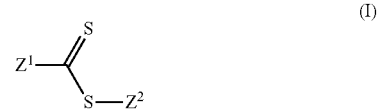

wherein:
- $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety;
- $Z^2$ is alkyl, haloalkyl, alkyl-C(=O)—O—$R^1$, benzyl, aryl, cycloalkyl, alkenyl, alkynyl, heteroalicyclic, heteroaryl, a polymeric moiety, an oligomeric moiety or S—C(=S)—$Z^1$;
- $R^1$ and $R^2$ are each independently H, alkyl, haloalkyl, cycloalkyl, benzyl, aryl, heteroalicyclic, heteroaryl, polymeric moiety or an oligomeric moiety 1; and
- each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, O—P(=O)(O$R^1$)$_2$, trihalomethyl, S(=O)—$R^1$, S(=O)$_2$—$R^1$, S(=O)$_2$—$NR^1R^2$, halide, cycloalkyl, alkoxy, nitro, cyano, $NR^1R^2$, C(O)$NR^1R^2$, $N(R^1)$C(=O)—$R^2$, hydroxy, alkylthiol, thiol, arylthiol, heteroarylthiol, C(=O)—O$R^1$, C(=O)—$R^1$, aryl, aryloxy, heteroaryloxy or any combination thereof;
- wherein $Z^i$ is heteroaryl, heteroalicyclic, hydroxyl, alkoxy, aryloxy, heteroaryloxy, $NR^1R^2$, thiol, arylthiol, alkylthiol, heteroarylthiol, a polymeric moiety with an electron donating group or an oligomeric moiety with an electron donating group;
- wherein $Z^2$ is alkyl, haloalkyl, benzyl, aryl, cycloalkyl, alkenyl, alkynyl, a polymeric moiety having a carbon chain or an oligomeric moiety having a carbon chain;

and wherein the at least one additive is represented by:

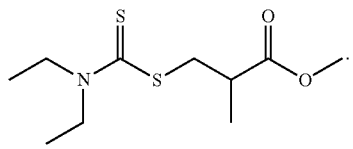

2. The lithium ion battery of claim 1, wherein the solvent comprises at least one of DMC (dimethyl carbonate), DEC (diethyl carbonate), EMC (ethyl methyl carbonate), EC (ethylene carbonate), EB (ethyl butyrate) and BA (butyl acetate).

3. A lithium ion battery comprising:
- at least one anode comprising active material based on Si, Ge and/or Sn,
- at least one cathode comprising active material based on at least one formulation comprising lithium iron-phosphorus (LFP) oxide or lithium metal oxide (LiMeO), wherein Me is one or more metal selected from nickel, cobalt, manganese and aluminum and Li and 0 represent one or more respective lithium and oxygen atoms, and
- electrolyte comprising:
- solvent comprising at least one linear carbonate and/or ester and at least one cyclic carbonate and/or ester,
- at least one dissolved lithium salt, and
- at least one additive that is represented by formula (I):

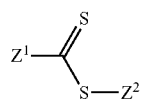

wherein:
- $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety;
- $Z^2$ is alkyl, haloalkyl, alkyl-C(=O)—O—$R^1$, benzyl, aryl, cycloalkyl, alkenyl, alkynyl, heteroalicyclic, heteroaryl, a polymeric moiety, an oligomeric moiety or S—C(=S)—$Z^1$;
- $R^1$ and $R^2$ are each independently H, alkyl, haloalkyl, cycloalkyl, benzyl, aryl, heteroalicyclic, heteroaryl, polymeric moiety or an oligomeric moiety 1; and
- each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, O—P(=O)(O$R^1$)$_2$, trihalomethyl, S(=O)—$R^1$, S(=O)$_2$—$R^1$, S(=O)$_2$—$NR^1R^2$, halide, cycloalkyl, alkoxy, nitro, cyano, $NR^1R^2$, C(O)$NR^1R^2$, $N(R^1)$C(=O)—$R^2$, hydroxy, alkylthiol, thiol, arylthiol, heteroarylthiol, C(=O)—O$R^1$, C(=O)—$R^1$, aryl, aryloxy, heteroaryloxy or any combination thereof;
- wherein the lithium ion battery further comprises at least one of VC (vinylene carbonate) and FEC (fluoroethylene carbonate); and wherein the at least one additive is represented by:

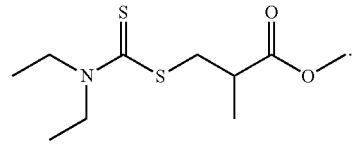

4. A lithium ion battery comprising:
- at least one anode comprising active material based on Si, Ge and/or Sn,
- at least one cathode comprising active material based on at least one formulation comprising lithium iron-phosphorus (LFP) oxide or lithium metal oxide (LiMeO), wherein Me is one or more metal selected from nickel, cobalt, manganese and aluminum and Li and 0 represent one or more respective lithium and oxygen atoms, and
- electrolyte comprising:
- solvent comprising at least one linear carbonate and/or ester and at least one cyclic carbonate and/or ester,
- at least one dissolved lithium salt, and
- at least one additive that is represented by formula (I):

wherein:
- $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, benzyl, thiol, arylthiol, alkylthiol, heteroarylthiol, a polymeric moiety or an oligomeric moiety;

$Z^2$ is alkyl, haloalkyl, alkyl-C(=O)—O—$R^1$, benzyl, aryl, cycloalkyl, alkenyl, alkynyl, heteroalicyclic, heteroaryl, a polymeric moiety, an oligomeric moiety or S—C(=S)—$Z^1$;

$R^1$ and $R^2$ are each independently H, alkyl, haloalkyl, cycloalkyl, benzyl, aryl, heteroalicyclic, heteroaryl, polymeric moiety or an oligomeric moiety 1; and each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, O—P(=O)(O$R^1$)$_2$, trihalomethyl, S(=O)—$R^1$, S(=O)$_2$—$R^1$, S(=O)$_2$—N$R^1R^2$, halide, cycloalkyl, alkoxy, nitro, cyano, N$R^1R^2$, C(O)N$R^1R^2$, N($R^1$)C(=O)—$R^2$, hydroxy, alkylthiol, thiol, arylthiol, heteroarylthiol, C(=O)—O$R^1$, C(=O)—$R^1$, aryl, aryloxy, heteroaryloxy or any combination thereof; and wherein the at least one additive is represented by:

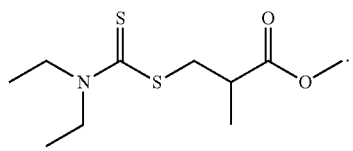

5. The lithium ion battery of claim 1, comprising cathode active material based on at least one formulation comprising lithium iron-phosphorus (LFP) oxide, lithium Nickel-Manganese-Cobalt (NMC) oxide, modified Li-NMC oxide and/or lithium Nickel Cobalt Aluminum oxide (NCA).

6. A lithium ion battery comprising:
at least one anode comprising active material based on Si, Ge and/or Sn,
at least one cathode comprising active material based on at least one formulation comprising lithium iron-phosphorus (LFP) oxide or lithium metal oxide (LiMeO), wherein Me is one or more metal selected from nickel, cobalt, manganese and aluminum and Li and 0 represent one or more respective lithium and oxygen atoms, and
electrolyte comprising:
solvent comprising at least one linear carbonate and/or ester and at least one cyclic carbonate and/or ester,
at least one dissolved lithium salt, and
at least one additive represented by formula (Ia):

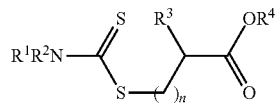

(Ia)

wherein
$R^1$ and $R^2$ are each independently H, alkyl, haloalkyl, cycloalkyl, aryl, heteroalicyclic, benzyl, heteroaryl, polymeric moiety or an oligomeric moiety or $R^1$, $R^2$ and the adjacent nitrogen form a heteroaryl or a heteroalicyclic ring;
$R^3$ is H, alkyl, haloalkyl, alkenyl, alkynyl, cycloalkyl, aryl, heteroalicyclic heteroaryl, alkoxy, hydroxy, O—P(=O)(O$R^1$)$_2$, thiol, alkylthiol, aryloxy, heteroaryloxy, arylthiol, heteroarylthiol, nitro, halide, trihalomethyl, cyano, benzyl, C(O)N$R^1R^2$, N$R^1R^2$, N($R^1$)C(=O)—$R^2$, C(=O)—O$R^1$, S(=O)—$R^1$, S(=O)$_2$—$R^1$ or S(=O)$_2$—N$R^1R^2$; $R^4$ is H, alkyl, haloalkyl, cycloalkyl, aryl, heteroalicyclic, benzyl or heteroaryl; each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $R^1$, $R^2$, $R^3$ or $R^4$ is optionally substituted with one or more of alkyl, haloalkyl, alkenyl, alkynyl, heteroalicyclic, heteroaryl, O—P(=O)(O$R^1$)$_2$, trihalomethyl, cyano, S(=O)—$R^1$, S(=O)$_2$—$R^1$, S(=O)$_2$—N$R^1R^2$, halide, cycloalkyl, alkoxy, nitro, N$R^1R^2$, C(O)N$R^1R^2$, N($R^1$)C(=O)—$R^2$, hydroxy, alkylthiol, thiol, arylthiol, heteroarylthiol, C(=O)—O$R^1$, C(=O)—$R^1$, aryl, aryloxy, heteroaryloxy or any combination thereof; and
n is an integer between 1 and 10;
wherein the lithium ion battery further comprises at least one of VC (vinylene carbonate) and, FEC (fluoroethylene carbonate); and
wherein the at least one additive is represented by:

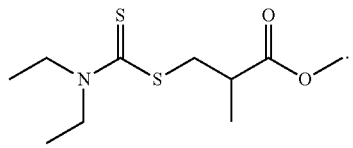

7. The lithium ion battery of claim 6, wherein the solvent comprises at least one of DMC (dimethyl carbonate), DEC (diethyl carbonate), EMC (ethyl methyl carbonate), EC (ethylene carbonate), EB (ethyl butyrate) and BA (butyl acetate).

8. The lithium ion battery of claim 6, comprising cathode active material based on at least one formulation comprising lithium iron-phosphorus (LFP) oxide, lithium Nickel-Manganese-Cobalt (NMC), modified Li-NMC oxide and/or lithium Nickel Cobalt Aluminum oxide (NCA).

9. A lithium ion battery comprising:
at least one anode comprising active material based on Si, Ge and/or Sn,
at least one cathode comprising active material based on at least one formulation comprising lithium iron-phosphorus (LFP) oxide or lithium metal oxide (LiMeO), wherein Me is one or more metal selected from nickel, cobalt, manganese and aluminum and Li and 0 represent one or more respective lithium and oxygen atoms, and
electrolyte comprising:
solvent comprising at least one linear carbonate and/or ester and at least one cyclic carbonate and/or ester,
at least one dissolved lithium salt, and
at least one additive represented by:

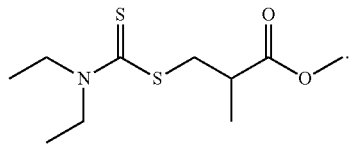

10. The lithium ion battery of claim 9, wherein the solvent comprises at least one of DMC (dimethyl carbonate), DEC (diethyl carbonate), EMC (ethyl methyl carbonate), EC (ethylene carbonate), EB (ethyl butyrate) and BA (butyl acetate).

11. The lithium ion battery of claim 9, further comprising at least one of VC (vinylene carbonate) and, FEC (fluoroethylene carbonate).

12. The lithium ion battery of claim 9, comprising cathode active material based on at least one formulation comprising lithium iron-phosphorus (LFP) oxide, lithium Nickel-Manganese-Cobalt (NMC) oxide, modified Li-NMC oxide and/or lithium Nickel Cobalt Aluminum oxide (NCA).

13. The lithium ion battery of claim 1, comprising cathode active material based on at least one formulation comprising lithium iron-phosphorus (LFP) oxide, lithium Nickel-Manganese-Cobalt (NMC) oxide, modified Li-NMC oxide and/or lithium Nickel Cobalt Aluminum oxide (NCA).

14. The lithium ion battery of claim 1, further comprising at least one of VC (vinylene carbonate) and, FEC (fluoroethylene carbonate).

15. The lithium ion battery of claim 3, wherein the solvent comprises at least one of DMC (dimethyl carbonate), DEC (diethyl carbonate), EMC (ethyl methyl carbonate), EC (ethylene carbonate), EB (ethyl butyrate) and BA (butyl acetate).

16. The lithium ion battery of claim 3, comprising cathode active material based on at least one formulation comprising lithium iron-phosphorus (LFP) oxide, lithium Nickel-Manganese-Cobalt (NMC) oxide, modified Li-NMC oxide and/or lithium Nickel Cobalt Aluminum oxide (NCA).

17. The lithium ion battery of claim 4, wherein the solvent comprises at least one of DMC (dimethyl carbonate), DEC (diethyl carbonate), EMC (ethyl methyl carbonate), EC (ethylene carbonate), EB (ethyl butyrate) and BA (butyl acetate).

18. The lithium ion battery of claim 4, comprising cathode active material based on at least one formulation comprising lithium iron-phosphorus (LFP) oxide, lithium Nickel-Manganese-Cobalt (NMC) oxide, modified Li-NMC oxide and/or lithium Nickel Cobalt Aluminum oxide (NCA).

\* \* \* \* \*